US012203642B2

(12) United States Patent
Budavári et al.

(10) Patent No.: US 12,203,642 B2
(45) Date of Patent: Jan. 21, 2025

(54) LUMINAIRE HEAD WITH A REMOVABLE CAP

(71) Applicant: Schreder S.A., Brussels (BE)

(72) Inventors: Péter Budavári, Pilisszentiván (HU); Zoltán Janki, Pilisszentiván (HU); János Péter Szügyi, Pilisszentiván (HU); Ferenc Lámfalusi, Pilisszentiván (HU)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 18/257,752

(22) PCT Filed: Dec. 15, 2021

(86) PCT No.: PCT/EP2021/085929
§ 371 (c)(1),
(2) Date: Jun. 15, 2023

(87) PCT Pub. No.: WO2022/129193
PCT Pub. Date: Jun. 23, 2022

(65) Prior Publication Data
US 2024/0110692 A1  Apr. 4, 2024

(30) Foreign Application Priority Data

Dec. 15, 2020  (NL) .................................. 2027116

(51) Int. Cl.
*F21V 23/06*    (2006.01)
*F21V 23/00*    (2015.01)

(52) U.S. Cl.
CPC ............ *F21V 23/06* (2013.01); *F21V 23/002* (2013.01)

(58) Field of Classification Search
CPC ............................... F21V 23/06; F21V 23/002
See application file for complete search history.

(56) References Cited

U.S. PATENT DOCUMENTS

| 5,243,508 | A  | * | 9/1993 | Ewing | F21S 2/005 |
| | | | | | 362/802 |
| 5,803,590 | A  | * | 9/1998 | Wedell | F21V 21/116 |
| | | | | | 362/396 |
| 6,872,883 | B2 | * | 3/2005 | Ginsburg | H02G 3/185 |
| | | | | | 362/153.1 |
| 7,014,339 | B2 | * | 3/2006 | Sears, Jr. | F21V 17/107 |
| | | | | | 362/265 |

(Continued)

FOREIGN PATENT DOCUMENTS

JP    H09298010 A    11/1997

OTHER PUBLICATIONS

PCT International Search Report and Written Opinion, Application No. PCT/EP2021/085929, mailed Mar. 21, 2022, 10 pages.

*Primary Examiner* — Mary Ellen Bowman
(74) *Attorney, Agent, or Firm* — McDonnell Boehnen Hulbert & Berghoff LLP

(57) ABSTRACT

Example embodiments relate to luminaire heads with removable caps. One example luminaire head includes a housing having a cap opening. The luminaire head also includes a removable cap for closing the cap opening of the housing. The removable cap has an inner side and an outer side. Additionally, the luminaire head includes one or more connectors provided to the inner side of the removable cap for connecting at least a first wiring to a second internal wiring of the luminaire head.

20 Claims, 12 Drawing Sheets

(56) References Cited

U.S. PATENT DOCUMENTS

| | | | |
|---|---|---|---|
| 10,364,972 B1* | 7/2019 | Breedlove, Sr. | F21V 15/01 |
| 10,704,768 B2* | 7/2020 | Guercio | F21V 23/06 |
| 10,801,702 B1* | 10/2020 | Thurman | F21V 19/0055 |
| 2010/0190375 A1* | 7/2010 | Rohde | H01R 13/5202 |
| | | | 439/549 |
| 2019/0044294 A1* | 2/2019 | Siacotos | G01D 11/24 |
| 2021/0408744 A1* | 12/2021 | Thijs | H01R 13/502 |

\* cited by examiner

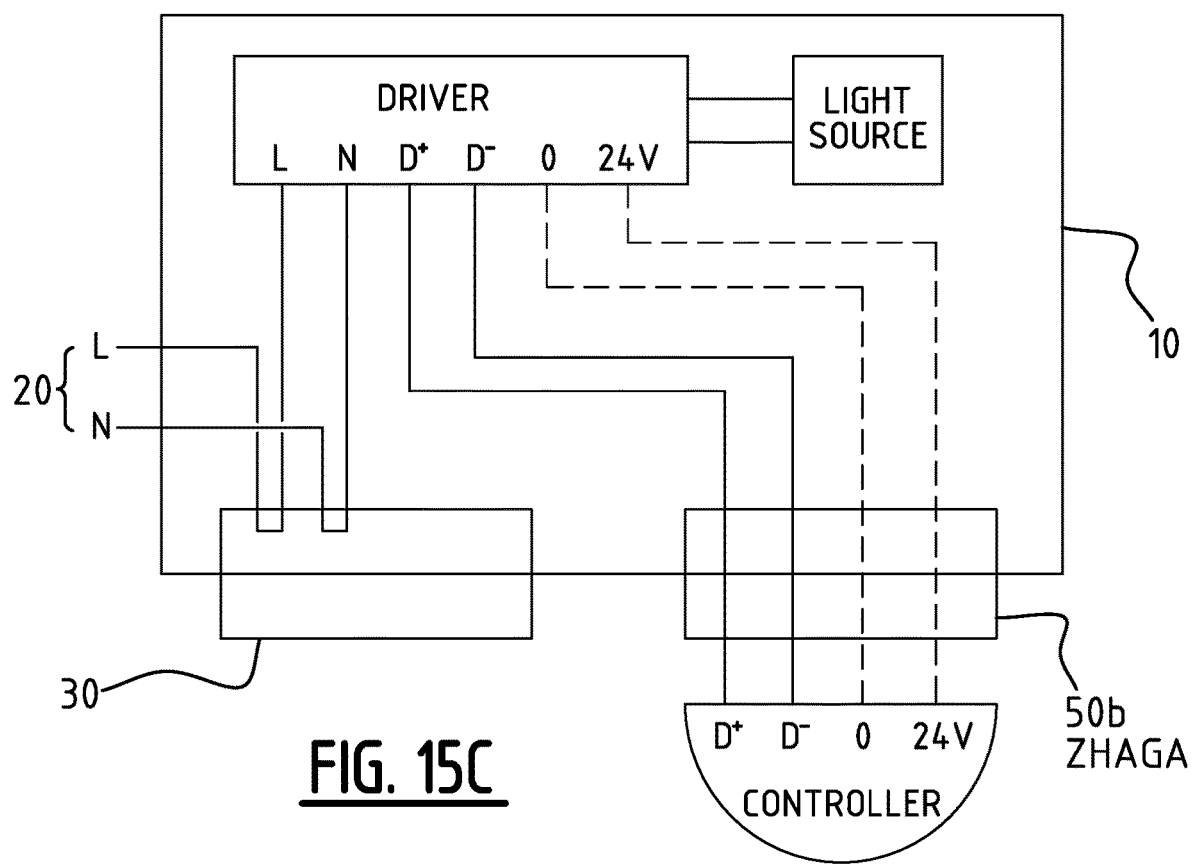

LUMINAIRE HEAD WITH A REMOVABLE CAP

CROSS-REFERENCE TO RELATED APPLICATIONS

The present application is a national stage entry of PCT/EP2021/085929 filed Dec. 15, 2021, which claims priority to NL 2027116 filed Dec. 15, 2020, the contents of each of which are hereby incorporated by reference.

FIELD OF INVENTION

The present invention relates to a luminaire head with a removable cap, to a method for installing or performing maintenance of such a luminaire head, to a cap for use in a luminaire head and to the use of such a cap in a luminaire head.

BACKGROUND

Luminaires comprise typically a luminaire housing in which at least one light source is arranged, the light source being driven by a driver receiving power from the mains. Additionally, modules may be provided on the luminaire head, notably via standard socket receptacles, which need as well to receive power from the mains and/or exchange power and/or data with the driver and/or other internal components of the luminaire. Those modules may be configured for performing controlling and/or sensing and/or processing, for instance they may be configured for wireless communications, for sensing, or for additional external data processing.

Luminaire networks in urban or industrial environments may contain large numbers of luminaires such that upon installation and maintenance, the manual work involved for connecting/disconnecting the luminaires to the mains and individually arranging the specific connections between the different subparts of the luminaire head may be cumbersome and expensive.

SUMMARY

The object of embodiments of the invention is to provide a luminaire head, a method for installing or performing maintenance of a luminaire head, a cap for use in a luminaire head and a use of such a cap in a luminaire head, which facilitates the process of connecting a first wiring, like the mains, to a second internal wiring of the luminaire head, connected for instance to the driver of the lamp.

According to a first aspect of the invention, there is provided a luminaire head comprising a housing having a cap opening, a removable cap for closing the cap opening of the housing, said removable cap having an inner side and an outer side, one or more connectors provided to the inner side of the removable cap for connecting at least a first wiring to a second internal wiring of the luminaire head. In this way, one or more connectors can be at will exposed outside of the housing and easily accessed for connecting a first wiring and a second internal wiring. In practice the user can remove the cap, make the connections on the inner side of the cap when in its removed position, and put the cap back once the connections are made, closing the housing back in its original disposition.

In accordance with said first aspect, a wiring connection is realized in an easy, flexible and efficient manner during installation or maintenance of the luminaire head.

Preferred embodiments relate to luminaire heads for outdoor luminaires. By outdoor luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas, access roads to private building infrastructures, warehouses, industry halls, etc.

According to an exemplary embodiment, the housing has a cable opening and the first wiring comprises at least one wire extending through the cable opening. In this way, a connection between an external wiring (the first wiring) and an internal wiring (the second wiring) is easily realized. For example, an external cable with multiple wires is first arranged inside the housing of the luminaire head via the cable opening and later connected to the internal wiring of the luminaire head through the one or more connectors of the cap. The outer side of the cap is preferably a uninterrupted surface such that the cap is closed on the outer side and acts as a closing lid of the cap opening.

According to an exemplary embodiment, the removable cap has a cable opening creating a passage between the inner side and the outer side and the first wiring comprises at least one wire extending through the cable opening inside the housing. In this way a first wiring can be brought inside the housing and in the vicinity of the connectors for an easy wiring. It is noted that an external wiring or cable may be brought inside the housing through a cable opening in the housing and/or in the cap. Preferably the first wiring is a cable, more preferably a multi-wire cable.

According to an exemplary embodiment, the at least one wire extending through the cable opening comprises at least one mains wire. In this way, when a cable opening is provided in the luminaire housing, the connection between the mains and the internal wiring of the luminaire is delocalized with respect to the entrance of the mains wiring in the luminaire head in order to be separately accessible. Additionally, the separate provision of the removable cap allows a phased installation of the luminaire head, wherein the mains wiring is arranged in the luminaire head independently from its connection to the second internal wiring for connecting one or more components such as a driver of the luminaire head. Alternatively or in addition, the at least one wire extending through the cable opening comprises another sort of power wire or a data wire external to the luminaire head.

According to an exemplary embodiment, the cap is rotatable around an axis in the cap opening between a first position in which the cap is free and a second position in which the cap is fixed in the cap opening. Preferably a thread or a bayonet may be provided between the cap and the housing. In this way, an operator can easily install and remove the cap. Alternatively the cap is movable by translation in the cap opening, using for instance a snap-fit mechanism or other well known alternatives to close the cap opening.

According to an exemplary embodiment, the one or more connectors are oriented to guide the first and the second internal wiring substantially parallel to an axial direction of the cap. Preferably the one or more connectors are oriented to guide the first and the second internal wiring in a direction substantially perpendicular to the surface of the cap opening. In this way, more space is provided for accommodating a plurality of connectors on the inner side of the cap. In addition in this way a plurality of wires extending between the inside of the housing and the cap are oriented in substantially the same direction creating a wire harness of parallel wires which can be easily pushed into the housing and easily pulled out of the housing.

According to an exemplary embodiment, the one or more connectors are fixed in the cap through a snap-fit mechanism. Preferably one or more compartments with snap-fit mechanisms may be provided on the inner side of the cap to accommodate the one or more connectors. Alternatively, the connectors could be fixed to the cap using other means, including for instance a screw and/or glue. In this way, standard connectors can be used and their number adapted to the specific connections of a given luminaire head. Preferably, each connector is configured for receiving at least two wires, preferably at least three wires. It is noted that a connector may or may not have to be removed from its compartment to receive wires. Preferably the first and/or the second internal wiring comprise respectively at least two wires, preferably at least three wires. In this way, DC wires, AC wires as well as data wires from different origins (among which mains, driver, external module, for example arranged in a receptacle socket assembly, an internal component in the housing, an internal controller, a metering device) can be interconnected in various ways depending on circumstances. For instance the first wiring may comprise wires for high voltage AC power, for instance 230V connected to the driver. The first wiring may comprise typically a first line wire L, a neutral wire N, or optionally a ground or equipotential wire G or PE, a second line wire Lp. If no external module is present on the luminaire head, only connectors receiving two wires may be used. More preferably up to five connectors may be provided on the inner side of the cap. The connectors may be two pole connectors or three pole connectors. If an external module is present on the luminaire head, two pole or three pole connectors may be used e.g. depending respectively on whether the external module is directly connected to the first wiring or whether the connection between the external module and the first wiring is also realized in the cap. Alternatively or additionally the first wiring may comprise two low voltage DC main wires coming in the luminaire head. The DC wires may be interconnected with two DC inputs of the driver and/or with two DC inputs of an external module, for example arranged in a receptacle socket assembly in the housing, via two connectors, each connector receiving two or three wires. Data wires coming from an external module may be connected with data inputs/outputs of the internal wiring, for instance of the driver, via additional connectors, each receiving two wires. It is noted that the internal wiring may be connected to any one of or a combination of an internal controller, a metering device, an internal component of the luminaire head, the driver.

According to an exemplary embodiment, the largest dimension of the removable cap is smaller than 15 centimeters, preferably smaller than 10 centimeter, more preferably between 4 and 10 centimeters. Preferably the cap is dimensioned to fit in the hand of an operator. In this way, an operator may hold the cap in one of his hands and perform the connections of the first and second internal wiring with the other hand.

According to an exemplary embodiment, the cap opening is substantially round. In this way, an easy grip and manipulation of the cap can be achieved. Preferably, the diameter of the cap opening is between 5 and 15 centimeters, preferably between 4 and 10 centimeters. Alternatively, the cap opening has another rotation symmetrical shape to receive a rotatable cap or any another shape for receiving effectively a cap.

According to an exemplary embodiment, the removable cap is configured to be fixed toolless to the housing. Preferably a thread or a bayonet may be provided between the cap and the housing. In this way, maintenance is facilitated. Given the location of luminaire heads often on top of poles, an easy tool-les manipulation greatly simplifies the maintenance and/or installation of the luminaire head.

According to an exemplary embodiment, there is provided a seal between the cap and the housing. In this way, the housing is water-, dust-, and dirt-proof and the luminaire head is adapted to outdoor uses. Preferably, the seal may be arranged on the cap. In this way, when fixing the cap in the cap opening, the housing is hermetically sealed providing a water-, dust-, and dirt-proof housing. Alternatively or in addition a seal may be arranged on the housing in the cap opening.

According to an exemplary embodiment, the housing has a socket opening, and there is provided a receptacle socket assembly mounted in the socket opening. Alternatively, the housing has a module opening and there is provided a module in the module opening. For instance, a module may be a sensor or another additional device without a specific standard connection nor a receptacle socket assembly.

According to an exemplary embodiment, the first wiring comprises at least a wire connected to the inner side of the receptacle socket assembly. Alternatively or in addition, the second wiring comprises at least a wire connected to the inner side of the receptacle socket assembly. In this way the connection between the receptacle socket assembly on the one hand and on the other hand the second internal wiring of the luminaire head is delocalized with respect to the receptacle socket assembly in order to be separately accessible. The separate provision of the removable cap allows a phased installation of the luminaire head, wherein the wiring for the receptacle socket assembly can be arranged in the luminaire head independently from its connection to the driver and/or the mains. Preferably an external mains wiring is connected either directly to the cap or directly to the receptacle socket assembly. More preferably, the receptacle socket assembly is one of a NEMA or Zhaga socket assembly. In this way, standardized wires of a known standard socket assembly can be interconnected to the rest of the luminaire in various ways depending on circumstances. Alternatively, the first wiring comprises at least a wire connected to the inner side of the module provided in a module opening. Alternatively or in addition, the second wiring comprises at least a wire connected to the inner side of the module provided in a module opening According to an exemplary embodiment, the receptacle socket assembly may be implemented as described in PCT publication WO2017/133793 in the name of the applicant, which is included herein by reference. Optionally, the receptacle socket assembly may be configured and/or mounted as described in patent application PCT/EP2020/068854 or PCT/EP2020/060751 in the name of the applicant, which are included herein by reference.

The receptacle socket assembly and an external module may be configured to be coupled through a twist-lock mechanism as described in ANSI C136.10-2017 standard or ANSI C136.41-2013 standard or Zhaga Interface Specification Standard (Book 18, Edition 1.0, July 2018, see https://www.zhagastandard.org/data/downloadables/I/O/8/1/book_18.pdf), which are included herein by reference.

According to an exemplary embodiment, the housing further comprises a fuse holder guiding assembly, for guiding one or more fuse holders. The fuse holder is holding at least one fuse and the fuse holder guiding assembly is accessible through the cap opening. In this way, the connector cap has an additional function related to the maintenance of the fuses. Preferably, the cap opening is dimensioned such that the fuse holder and/or a fuse can be removed through the cap opening. In this way, an operator can easily access the fuse holder and install a suitable fuse while setting the electrical connections in the cap, or replace a fuse if a malfunction was reported. More preferably, the fuse holder guiding assembly is configured with a rail such that the fuse holder is slidable under the cap opening. In this way, the process of replacing a fuse is simplified, and the movement of the fuse is controlled, avoiding any damage to the connections and wirings inside the housing.

According to an exemplary embodiment, there is provided a luminaire head according to any of the above embodiments, further comprising a light source, and a driver for driving the light source, the driver receiving and/or providing power and/or data from/to the internal wiring of the luminaire head. The arrangement of the driver and the light source in the luminaire together with the removable cap enables an easy maintenance of the luminaire head as a unit.

According to another aspect of the invention, there is provided a method for installing or performing maintenance of a luminaire head with a housing having a cap opening, wherein a cap having an inner side and an outer side can be arranged removably in the cap opening, and wherein one or more connectors are provided to the inner side of the cap. The method comprises the steps of arranging a first wiring, manipulating the cap to expose the inner side of the cap, connecting the first wiring to a second internal wiring of the luminaire head via the one or more connectors, and placing the cap in position to close the cap opening of the housing. In this way, a wiring connection is realized in an easy, flexible and efficient manner during installation or maintenance of the luminaire head.

According to an exemplary embodiment, arranging the first wiring comprises arranging at least a wire in the housing through a cable opening in the housing. In this way, a connection between an external wiring and an internal wiring can be easily realized. An external cable with multiple wires can first be arranged inside the housing of the luminaire head and later connected to the internal wiring of the luminaire head. Alternatively or in addition, arranging a first wiring comprises arranging at least a wire in the housing through a cable opening in the cap. In this way, the cap may provide both an entry for an external wiring and a connection between such an external wiring and an internal wiring. Preferably, arranging the first wiring further comprises arranging at least a mains wire through the cable opening in the housing or in the cap. In this way, the connection between the mains and the internal wiring of the luminaire is delocalized with respect to the entrance of the mains wiring in the luminaire head in order to be separately accessible. The separate provision of the removable cap allows a phased installation of the luminaire head, wherein the mains wiring can be arranged in the luminaire head independently from its connection to the driver of the luminaire head.

According to an exemplary embodiment, there is provided the additional step of placing and/or removing a fuse through the cap opening. In this way, an easy maintenance and/or installation of the fuse is made available, adding another functionality to the removable cap, already used for making connections between wirings.

According to an exemplary embodiment, the method comprises arranging a socket assembly in a socket opening of the housing, and the step of connecting the first wiring to the second wiring comprises arranging at least a wire connected to the inner side of a receptacle socket assembly in a connector of the one or more connectors. In this way the connection between the receptacle socket assembly on the one hand and on the other hand the second internal wiring or the first wiring is delocalized with respect to the receptacle socket assembly in order to be separately accessible. The separate provision of the removable cap allows a phased installation of the luminaire head, wherein the wiring for the receptacle socket assembly can be arranged in the luminaire head independently from its connection to other components such as the driver and/or the mains.

According to another aspect of the invention, there is provided a cap for use in a luminaire head, preferably a luminaire head according to any of the above embodiments, the cap having an inner side and an outer side, said inner side being provided with one or more connectors for connecting a first wiring to a second internal wiring of the luminaire head. In this way, a housing is closed easily and a wiring connection is realized in an easy, flexible and efficient manner during installation or maintenance of the luminaire head.

According to an exemplary embodiment, the cap further comprises a cable opening for arranging at least one wire of the first wiring through the cap, said cable opening creating a passage from the inner side to the outer side of the cap. In this way, a wiring may be brought inside the housing in the vicinity of the connectors, such that the cap operates as a support for an easy connection and an interface for the entry of an external wiring inside the housing. Preferably, the cable opening is arranged in a center part of the cap. In this way, room is left for accommodating connectors at the periphery of the cap, in a rotation symmetric way. Preferably the first wiring is a cable, more preferably a multi-wire cable.

According to an exemplary embodiment, the cap further comprises a cable gland configured for allowing a rotation of the cap with respect to the at least one wire in an unlocked state and for locking the at least one wire in the cap in a locked state. In this way, the entry of the wiring is safely sealed and twisting as well as pulling efforts on the wiring are controlled.

According to an exemplary embodiment, a screw thread or a bayonet is provided on the periphery of the cap. In this way, maintenance is facilitated. Given the location of luminaire heads mostly on top of poles, an easy tool-les manipulation greatly simplifies the maintenance and/or installation of the luminaire head.

According to an exemplary embodiment, a seal is provided along the periphery of the cap. In this way, when fixing the cap in the cap opening, the housing is hermetically sealed providing a water-, dust-, dirt-proof housing.

According to an exemplary embodiment, the outer side of the cap is shaped for a tool-less installation, preferably using protrusions such as fins on the outer side of the cap. In this way an easy installation can be achieved.

Any one or more of the other features of the cap described above in connection with the luminaire head may also be implemented in the cap. For example, the cap may be round and have a diameter between 4 and 15 centimeters, preferably between 5 and 10 centimeters.

According to an exemplary embodiment, one or more compartments are provided on the inner side of the cap for accommodating the one or more connectors. In this way, connectors may be easily provided on the inner side of the cap. Preferably the one or more compartments are configured to maintain the connectors using snap-fit mechanisms. Alternatively, a screw or glue may be used.

According to another aspect of the invention, the use of a cap according to the previous aspect in a luminaire head is provided. In this way the process of connecting a first wiring, like the mains, to a second internal wiring of the luminaire head, connected for instance to the driver of the light source is improved and facilitated.

According to another aspect of the invention, there is provided a luminaire head comprising a housing having a cap opening, a removable cap for closing the cap opening of the housing, said removable cap having an inner side and an outer side. The removable cap has a cable opening creating a passage between the inner side and the outer side and a wiring comprising at least one wire extends through the cable opening inside the housing. In this way, an area under the cap can be at will exposed outside of the housing and easily accessed while a wiring (external wiring) is brought inside the housing in a secure way. In practice the user can remove the cap, make the connections, and put the cap back once the connections are made, closing the housing back in its original disposition.

According to an exemplary embodiment, the cap is rotatable around an axis in the cap opening between a first position in which the cap is free and a second position in which the cap is fixed in the cap opening. Preferably a thread or a bayonet may be provided between the cap and the housing. In this way, an operator can easily install and remove the cap. Alternatively the cap is movable by translation in the cap opening, using for instance a snap-fit mechanism or other well known alternatives to close the cap opening.

According to an exemplary embodiment, a cable gland is configured for allowing a rotation of the cap with respect to the wiring in an unlocked state and for locking the wiring in the cap in a locked state. In this way the entry of the wiring is safely sealed and twisting as well as pulling efforts on the wiring are controlled.

According to an exemplary embodiment, the largest dimension of the removable cap is smaller than 15 centimeters, preferably between 4 and 10 centimeters. Preferably the cap is dimensioned to fit in the hand of an operator. In this way, an operator may hold the cap in one of his hands and perform connections with the other hand.

According to an exemplary embodiment, the cap opening is substantially round. In this way, an easy grip and manipulation of the cap can be achieved. Preferably, the diameter of the cap opening is between 4 and 15 centimeters, preferably between 5 and 10 centimeters. Alternatively, the cap opening has another rotation symmetrical shape to receive a rotatable cap or any another shape for receiving effectively a cap.

According to an exemplary embodiment, the removable cap is configured to be fixed toolless to the housing. Preferably a thread or a bayonet may be provided between the cap and the housing. In this way, maintenance is facilitated. Given the location of luminaire heads often on top of poles, an easy tool-les manipulation greatly simplifies the maintenance and/or installation of the luminaire head.

According to an exemplary embodiment, there is provided a seal between the cap and the housing. In this way, the housing is water-, dust-, and dirt-proof and the luminaire head is adapted to outdoor uses. Preferably, the seal may be arranged on the cap. In this way, when fixing the cap in the cap opening, the housing is hermetically sealed providing a water-, dust-, and dirt-proof housing. Alternatively or in addition a seal may be arranged on the housing in the cap opening.

According to an exemplary embodiment, the housing has a socket opening, and there is provided a receptacle socket assembly mounted in the socket opening. Alternatively, the housing has a module opening and there is provided a module in the module opening. For instance, a module may be a sensor or another additional device without a specific standard connection nor a receptacle socket assembly.

According to an exemplary embodiment, the wiring comprises at least a wire connected to the inner side of the receptacle socket assembly. In this way the connection between the receptacle socket assembly on the one hand and on the other hand the internal wiring of the luminaire head is delocalized with respect to the receptacle socket assembly in order to be separately accessible. The separate provision of the removable cap allows a phased installation of the luminaire head, wherein the wiring for the receptacle socket assembly can be arranged in the luminaire head independently from its connection to the driver and/or the mains. More preferably, the receptacle socket assembly is one of a NEMA or Zhaga socket assembly. In this way, standardized wires of a known standard socket assembly can be interconnected to the rest of the luminaire in various ways depending on circumstances. Alternatively, the first wiring comprises at least a wire connected to the inner side of the module provided in a module opening. Alternatively or in addition, the second wiring comprises at least a wire connected to the inner side of the module provided in a module opening According to an exemplary embodiment, the receptacle socket assembly may be implemented as described in PCT publication WO2017/133793 in the name of the applicant, which is included herein by reference. Optionally, the receptacle socket assembly may be configured and/or mounted as described in patent application PCT/EP2020/068854 or PCT/EP2020/060751 in the name of the applicant, which are included herein by reference.

The receptacle socket assembly and an external module may be configured to be coupled through a twist-lock mechanism as described in ANSI C136.10-2017 standard or ANSI C136.41-2013 standard or Zhaga Interface Specification Standard (Book 18, Edition 1.0, July 2018, see https://www.zhagastandard.org/data/downloadables/I/O/8/1/book_18.pdf), which are included herein by reference.

According to an exemplary embodiment, the housing further comprises a fuse holder, for holding one or more fuses, said fuse holder being accessible through the cap opening. In this way, the connector cap has an additional function related to the maintenance of the fuses. Preferably, the cap opening is dimensioned such that the fuse can be removed through the cap opening. In this way, an operator can easily access the fuse holder and install a suitable fuse while setting the electrical connections in the cap, or replace a fuse if a malfunction was reported. More preferably, the fuse holder is configured with a rail such that the fuse is slidable under the cap opening. In this way, the process of replacing a fuse is simplified, and the movement of the fuse is controlled, avoiding any damage to the connections and wirings inside the housing.

According to an exemplary embodiment, there is provided a luminaire head according to any of the above embodiments, further comprising a light source, and a driver for driving the light source, the driver receiving power and/or data from the wiring passing through the cap. The arrangement of the driver and the light source in the luminaire together with the removable cap enables an easy maintenance of the luminaire head as a unit.

According to an exemplary embodiment, the outer side of the cap is shaped for a toolless installation, preferably using protrusions such as fins on the outer side of the cap. In this way an easy installation can be achieved.

In embodiments of the invention any components described in any one of the following patent applications of the applicant may be included in the luminaire head: a driver, optionally with one or more pluggable modules as described in PCT publication WO 2017/220690, an optical receiving means with control means as described in WO 2020/053342, a communication device as disclosed in NL application NL2023556 and PCT/EP2020/053326, a surge protection device as disclosed in PCT applications PCT/EP2020/050419, PCT/EP2020/050420, WO2020/064487 A1, and more generally any one of the components described in those documents which are included herein by reference.

The following clauses describe the last aspect of the invention: Luminaire head comprising:
- a housing having a cap opening,
- a removable cap for closing the cap opening of the housing, said removable cap having an inner side and an outer side,
- wherein the removable cap has a cable opening creating a passage between the inner side and the outer side and a wiring comprising at least one wire extends through the cable opening inside the housing.

Luminaire head according to the above clause, wherein the cap is rotatable around an axis in the cap opening between a first position in which the cap is free and a second position in which the cap is fixed in the cap opening.

Luminaire head according to any one of the above clauses, further comprising a cable gland configured for allowing a rotation of the cap with respect to the wiring in an unlocked state and for locking the wiring in the cap in a locked state.

Luminaire head according to any of the above clauses, wherein a largest dimension of the removable cap is smaller than 15 centimeters, preferably between 4 and 10 centimeters.

Luminaire head according to any of the above clauses, wherein the cap opening is substantially round.

Luminaire head according to any of the above clauses wherein the diameter of the cap opening is between 4 and 15 centimeters, preferably between 4 and 10 centimeters.

Luminaire head according to any of the above clauses, wherein the removable cap is configured to be fixed toolless to the housing.

Luminaire head according to any of the above clauses, further comprising a seal between the cap and the housing.

Luminaire head according to any of the above clauses, wherein the seal is arranged on the cap.

Luminaire head according to any of the above claims, wherein the housing has a socket opening, the luminaire head further comprising a receptacle socket assembly mounted in the socket opening.

Luminaire head according to clause 10, wherein the wiring comprises at least one wire connected to the inner side of the receptacle socket assembly.

Luminaire head according to clause 10 or 11, wherein the receptacle socket assembly is one of a NEMA or a Zhaga socket assembly.

Luminaire head according to any of the above clauses, further comprising a fuse holder arranged in the housing, for holding one or more fuses, said fuse holder being accessible through the cap opening.

Luminaire head according to the previous clause, wherein the cap opening is dimensioned such that a fuse can be removed through the cap opening.

Luminaire head according to clause 13 or 14, wherein the fuse holder is provided with a rail such that the fuse is slidable under the cap opening.

Luminaire head according to any of the above clauses, further comprising;
- a light source, and
- a driver for driving the light source, the driver receiving power and/or data from the wiring passing through the cap.

BRIEF DESCRIPTION OF THE FIGURES

These and other aspects of the present invention will now be described in more detail, with reference to the appended drawings showing preferred embodiments of the invention. Like numbers refer to like features throughout the drawings

FIG. 3 shows the housing of FIG. 1 with the cap of FIG. 2 mounted in the housing, while

FIGS. 15A, 15B and 15C illustrate schematic views of internal connections inside a cap 30 according to the exemplary first embodiment for three different configurations. In FIG. 15A no receptacle socket assembly 50 is present on the housing 10, while in FIG. 15B a NEMA receptacle socket assembly 50a is present on the housing 10, and in FIG. 15C a Zhaga receptacle socket assembly 50b is present on the housing 10.

DESCRIPTION OF EMBODIMENTS

Figure 1:
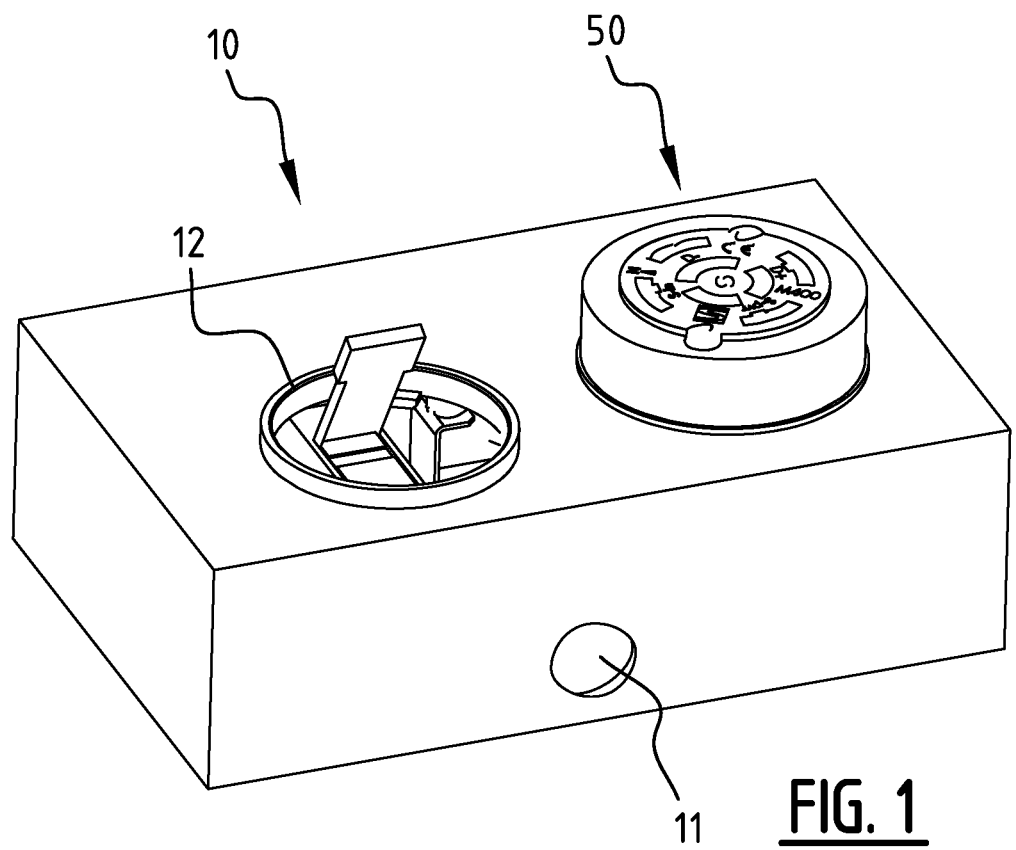
FIG. 1 illustrates a perspective view of an exemplary embodiment of a housing of a luminaire head, wherein the housing is drawn schematically as a box.

FIG. 1 shows a housing 10 of a luminaire head in a schematic way, not drawn to scale. The housing may have any suitable size or shape. The housing 10 of FIG. 1 typically accommodates a light source and a driver for driving the light source. The driver may receive power and/or data from an internal wiring provided in the housing of the luminaire head. The driver is typically powered from a mains wiring and may be further connected to one or more modules, typically control modules, plugged on the luminaire head via one or more receptacle socket assemblies 50. The one or more optional modules may be configured for performing controlling and/or sensing and/or processing and may be configured for instance for wireless communications, for light sensing, for external processing as known in the art.

From International Application PCT/EP/2019/081006 in the name of the present applicant, which is included herein by reference, is known for instance that lighting equipment for roadways, parking lots and other outdoor areas typically use plug twist-lock control modules containing different control blocks and/or sensors. Such a control module may comprise e.g. a light sensor for sensing the light level of ambient light to automatically switch light fixtures on at dusk and off at dawn. For uniformity throughout the lighting industry, electrical receptacles for receiving such control modules are mostly made according to specific standards such as standards approved by American National Standards Institute, Inc. (ANSI). Such receptacles are typically mounted on the top of a housing of the lighting equipment and are electrically connected to various components of the lighting equipment through wires. A module may be plugged into a receptacle 50 to provide for instance control for the lighting equipment.

The housing 10 of FIG. 1 constitutes an enclosure for the connection structure of the luminaire head. It is noted that although schematically represented as a box without a bottom, the housing 10 is meant as defining an enclosed area and the figures should be understood as showing only part of the housing 10.

Figure 2:
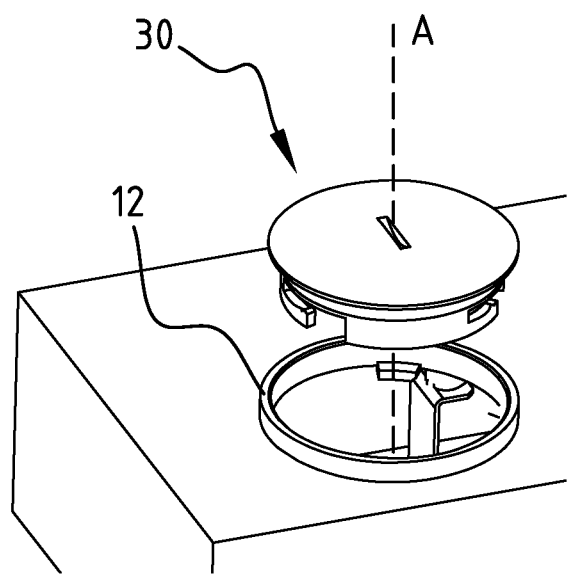
FIG. 2 illustrates a perspective view of an exemplary first embodiment of a cap for the housing of FIG. 1.

The housing 10 comprises a cable opening 11 for accommodating a first wiring and a cap opening 12 for accommodating a removable cap 30 (shown in FIG. 2). The first wiring may be the mains wiring providing power to the driver, the light source, any available module arranged in a receptacle socket assembly 50 in the housing and any other component of the luminaire head. The first wiring may enter the housing via the opening 11 as a cable accommodating a plurality of wires. The removable cap 30 illustrated in FIG. 2 may be provided to close the cap opening 12 in the housing 10. The removable cap 30 may have an inner side 31 facing the inside of the housing 10 when the cap 30 is closing the cap opening 12 and an outer side 32 facing the outside of the housing 10 when the cap is closing the cap opening 32. The cap 30 may further be rotatable around an axis A in the cap opening 12 between a first position in which the cap 30 is free from the housing 10 and a second position in which the cap closes the cap opening 12. For instance between the cap 30 and the housing 20 a thread or a bayonet mechanism 36 may be provided such that an operator may close the housing 10 by rotating the cap 30 in the cap opening 12. The axis of rotation A may be in a direction substantially perpendicular to the surface of the cap opening 12.

Figure 3:
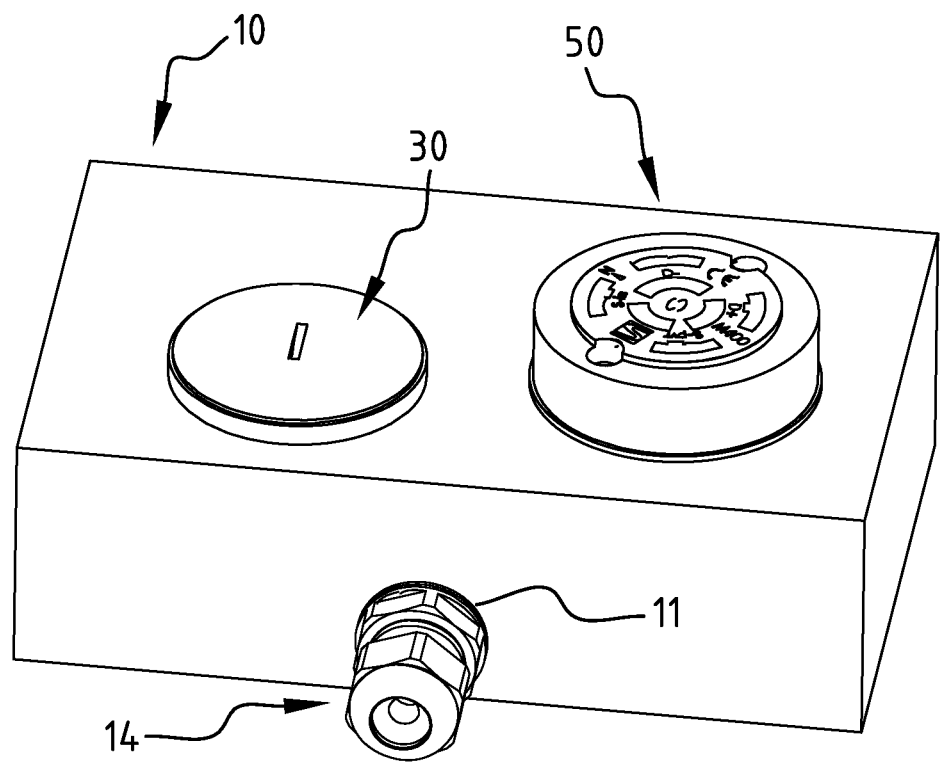

FIG. 3 illustrates a view when the cap 30 closes completely the cap opening 12. FIG. 3 shows a screw driver slit on the outer side 32 of the cap 30. Yet other embodiments with other configurations and shapes of outer side 32 of the cap 30 may be envisaged to allow the removable cap 30 to be fixed toolless to the housing. FIG. 3 further shows how a cable gland 14 may be provided at the cable opening 11 to provide a water, dust-, dirt-proof interface at the opening 11 letting through the first wiring 20.

Figure 4:
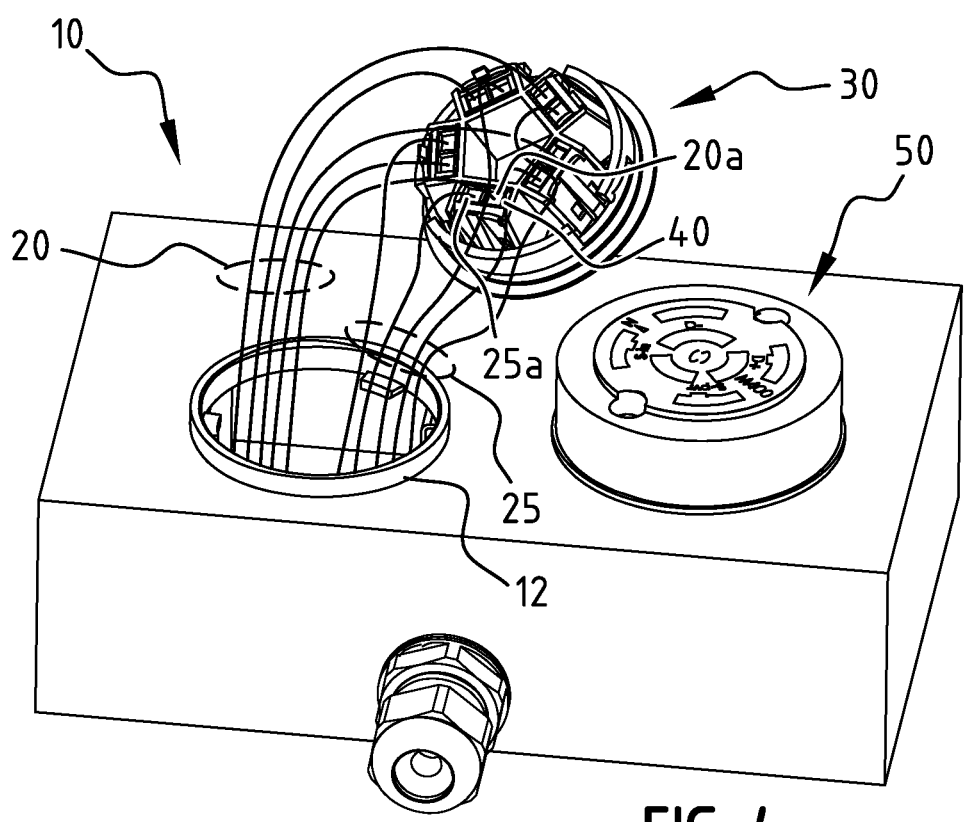
FIG. 4 shows the housing of FIG. 3 with the cap removed, illustrating the inner side of the cap.

FIG. 4 illustrates a view in which the removable cap 30 is free from the housing 10 and the inner side 31 of the cap 30 is exposed. One or more connectors 40 may be provided to the inner side 31 of the removable cap 30 for connecting a first wiring 20 to a second internal wiring 25. The first wiring 20 may comprise wires of a mains cable running through the cable opening 11. The second internal wiring 25 may be an internal wiring of the luminaire head, which may be further connected to a component in the luminaire head, e.g. the driver. The first wiring 20 and the second internal wiring 25 may each comprise a plurality of wires for power and/or data, which may extend through the cap opening 12. For instance the first wiring 20 and the second internal wiring 25 may each comprise five wires as represented in FIG. 4 and may be arranged in two bundles of wires, which may extend through the cap opening 12 towards the inner side 31 of the cap 30. One of the connectors 40 may receive at least one wire 20a from the first wiring 20 and at least one wire 25a from the second internal wiring 25 to create an interconnection. An operator upon installation and maintenance may choose to interconnect corresponding sorts of wires from the first wiring 20 and the second internal wiring 25. The one or more connectors 40 may be standard connectors. The connectors 40 may be snap-fit connectors enabling an easy insertion of the wires inside the one or more connectors 40.

Each connector 40 may be configured for receiving two wires of the same sort, that is to say wires serving the same purpose. For instance, the first wiring may be for high voltage AC power, for instance 230V connected to the driver. The first wiring may comprise typically a first line wire L, a neutral wire N, optionally a ground or equipotential wire G or PE, and a second line wire Lp. A second line wire Lp may be an alternate L wire for night electricity for instance. Additionally two low voltage DC wires may be present in the first wiring. Such DC mains wires coming in the luminaire head as part of the first wiring 20 may be interconnected with the two DC inputs of the driver present in the second internal wiring 25. Alternatively the low voltage DC wires may be used for data signals, typically for dimming. More precisely a ground wire coming from the mains and the corresponding ground wire coming from the driver may be fit in a connector 40 configured to receive and interconnect two wires, a neutral wire coming from the mains and the corresponding neutral wire coming from the driver may be fit in a connector 40 configured to receive and interconnect two wires while an AC potential wire L coming from the mains and the corresponding AC potential wire coming from the driver may be fit in another connector 40, also configured to receive and interconnect two wires. Similarly data wires coming from an external controller module may be connected with data inputs/outputs of the driver via additional connectors 40, each configured to receive and interconnect two wires, one coming from the driver and the other, corresponding one, coming from the receptacle socket assembly 50, on which the external controller module may be plugged. Optionally a safety cable (equipotential or ground) may be present between the cap and the housing.

After installation and/or during maintenance, when all wires of the first wiring 20 and of the second internal wiring 25 are interconnected, the cap 30 although still free from the cap opening 12 has a limited range of movement due to the harness of wires extending through the cap opening 12 towards the cap 30. The cap 30 in this situation may no longer fall off the housing. The first wiring 20 and the second internal wiring 25 may be arranged such that their length allows for the easy removal of the cap 30 and the easy access of the inner side 31 of the cap 30. The first wiring 20 and the second internal wiring 25 may be pulled outside of the housing 10 when the cap 30 is removed for installation and/or maintenance and pushed back inside the housing 10 when the cap 30 is put back into the cap opening 12.

Figure 5:
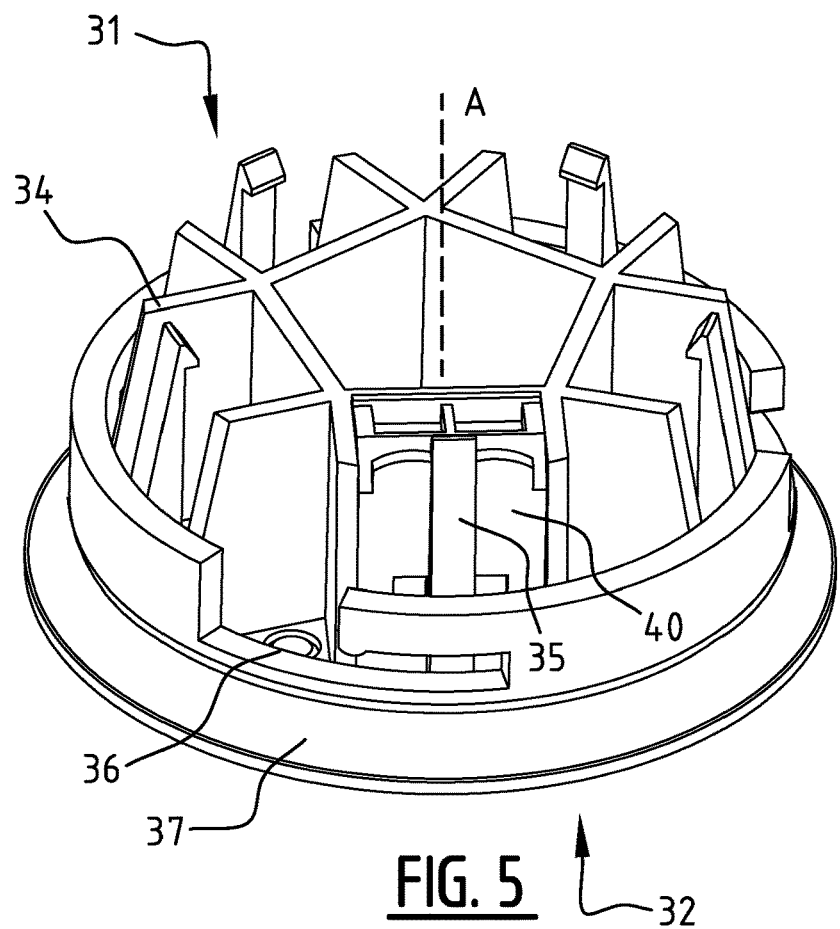
FIG. 5 illustrates an enlarged view of the inner side of a cap according to the exemplary first embodiment.

FIG. 5 illustrates an enlarged view of the inner side of a cap 30. In the cap 30, one or more connectors 40 may be accommodated in one or more compartments 34. The compartments 34 may be integral to cap 30, for instance the cap 30 may be moulded with the compartments 34, or compartments 34 may be provided separately on the cap 30. The one or more connectors 40 may be oriented to guide the first wiring 20 and the second internal wiring 25 substantially parallel to the axial direction A of the cap 30. The wires, for instance a wire 20a, and a wire 25a, from the first wiring 20 and the second internal wiring 25, when connected to the connectors 40, may then be guided in parallel to each other and form a harness, as discussed above, holding the cap 30 when the cap 30 is removed and free from the housing 10. Each connector 40 may further be fixed in the cap 30 through a snap-fit mechanism 35 holding the connector 40 inside a compartment 34. Alternatively, the connectors could be fixed to the cap using other means, including for instance screw and/or glue. Each connector 40 may be configured for receiving at least two wires, preferably at least three wires while the first wiring 20 and the second internal wiring 25 may each comprise at least two wires, preferably at least three wires to transmit either DC power, AC power or data signals.

Figure 6:
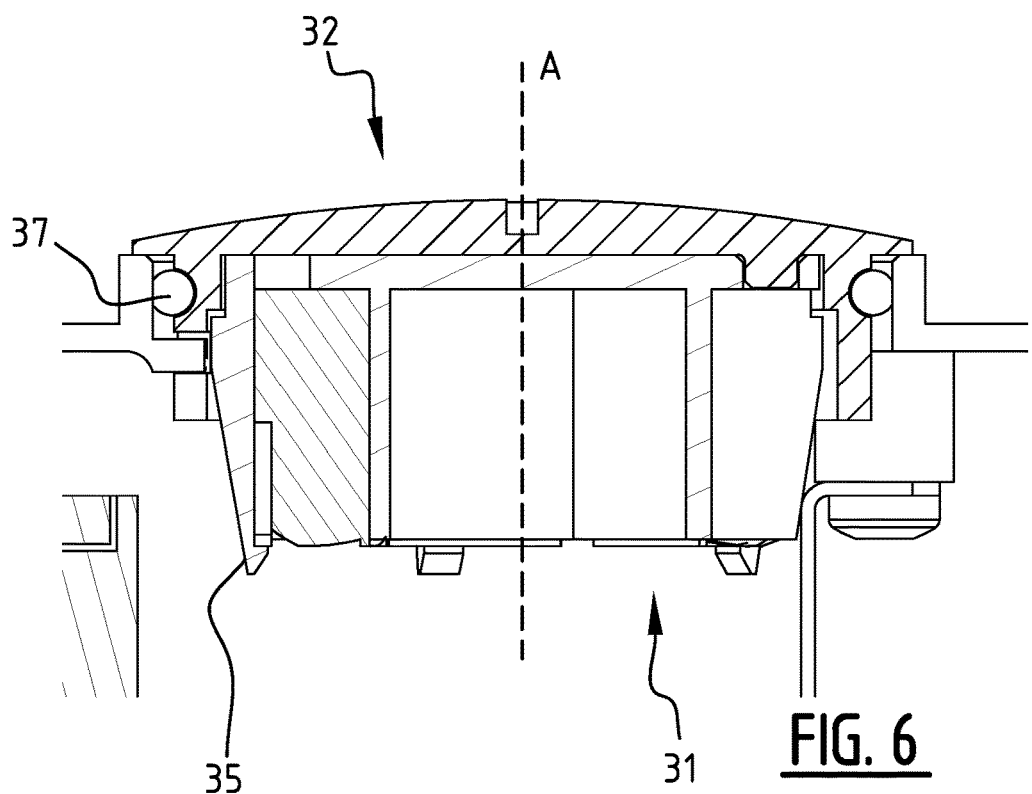
FIG. 6 illustrates a section of a cap according to the exemplary first embodiment fixed on a housing.

Further a bayonet mechanism 36 may be provided on the periphery of the cap 30 to interact with the cap opening 12. In this way the cap 30 may be rotated and locked in the cap opening 11 in a toolless manner. A seal 37 may be provided between the cap 30 and the cap opening 12 to prevent the ingress of water, dirt or dust inside the housing once the cap 30 is locked in position and closes the cap opening 12. The seal 37 may be arranged at the periphery of the cap and compressed when inserting the cap 30 in the cap opening 12 as illustrated in FIG. 6.

Further the largest dimension of the removable cap 30 may be smaller than 15 centimeters to be held in the hand of an operator. For example, the cap opening 12 may be substantially round and the diameter of the cap opening 12 may be between 4 and 15 centimeters, e.g. between 4 and 10 centimeters, between 5 and 7 centimeters. Other rotation symmetrical shapes may be envisaged as well.

Figure 7A:
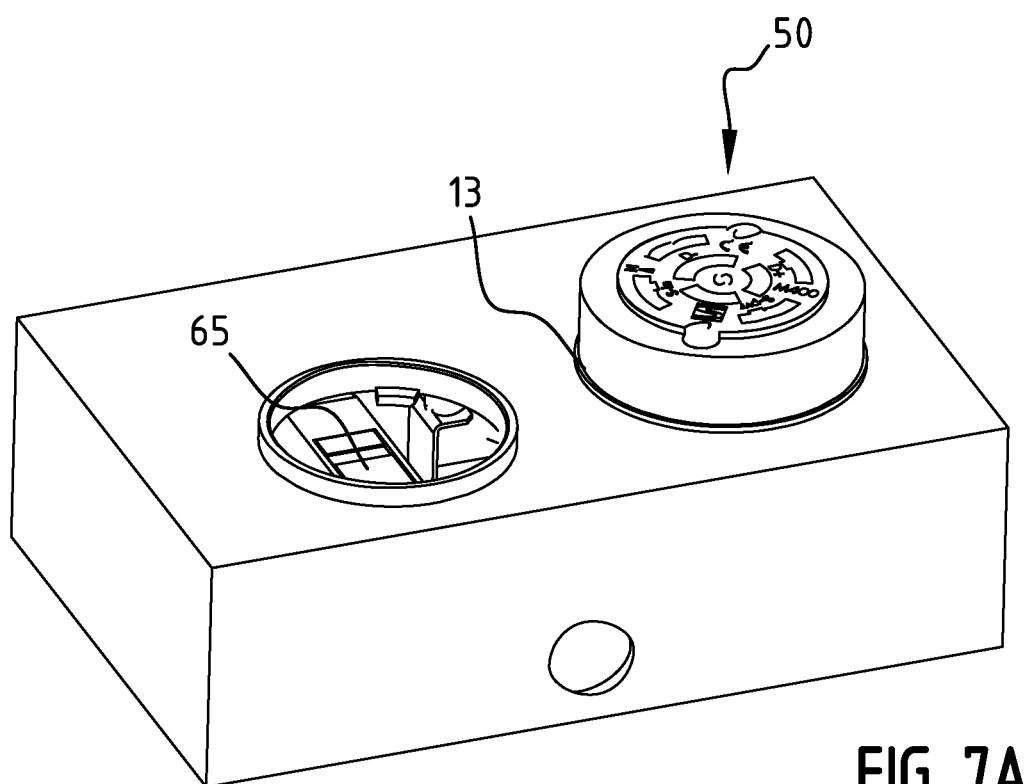
FIGS. 7A and 7B illustrates top and bottom perspective views of a housing according to an exemplary embodiment.
Figure 7B:
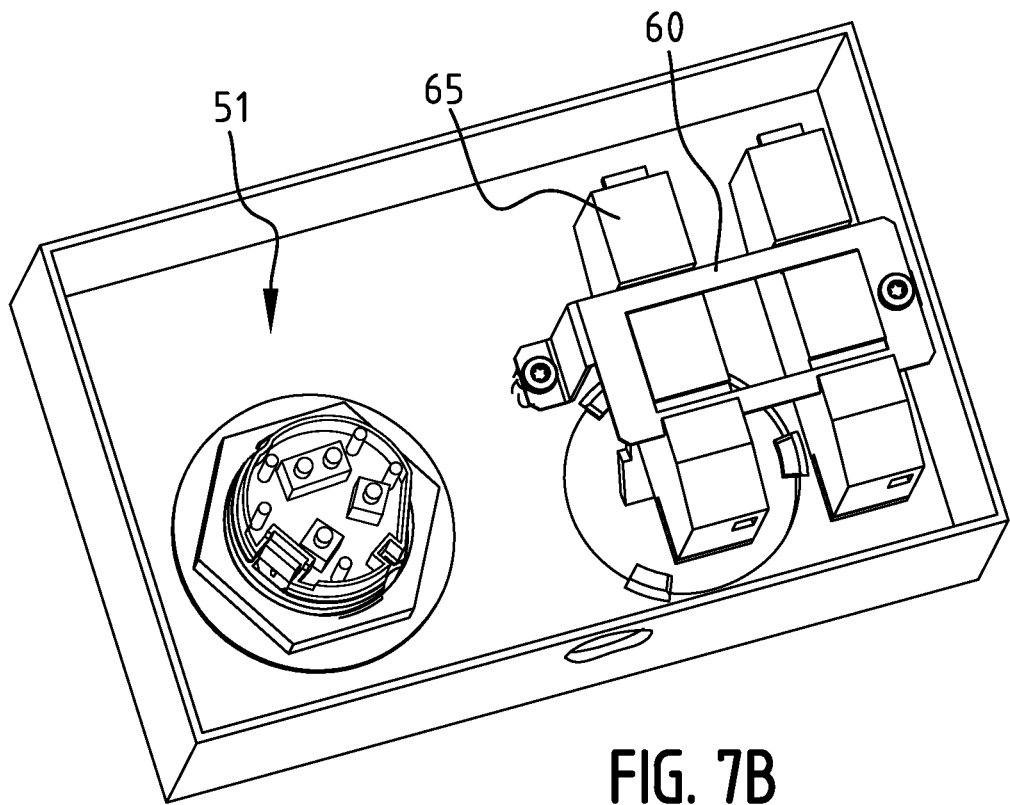

In a further embodiment, the housing 10 may also be meant as an enclosure for protection elements like fuses and act as a fuse compartment. The housing 10 may comprise a fuse holder guiding assembly 60 for holding one or more fuse holders 65, the fuse holder guiding assembly 60 and the one or more fuse holders 65 being accessible through the cap opening 12. As illustrated in FIGS. 7A and 7B, a fuse holder guiding assembly 60 may be fixed on an inner wall of the housing 10 and may be located in the vicinity of the cap opening 12, in particular fixed on the inner side of the wall on which the cap opening 12 is located. The cap opening 12 may be dimensioned such that the one or more fuse holders 65 can be removed through the cap opening 12. During maintenance and/or installation, an operator may thus remove the cap 30, access fuse holder guiding assembly 60 to replace a defective fuse or install a new fuse in an easy manner. The same cap 30 used for accessing the connection structure of the luminaire head may in this way serve as well as a lid to the fuse compartment of the luminaire head. The fuse holder guiding assembly 60 may be configured with a rail such that the one or more fuse holders 65 can slide under the cap opening 12. A fuse holder 65 may contain a fuse which may be released from the fuse holder 65 via a latch mechanism. The latch mechanism is represented closed in FIG. 7a and open in FIG. 1. Either the fuse holder 65 or only the fuse inside the fuse holder 65 may be replaced through the cap opening 12, depending on circumstances.

FIG. 7A further illustrates an exemplary embodiment where the housing 10 has a socket opening 13, and where a receptacle socket assembly 50 is mounted in the socket opening 13. The socket opening 13 may be located on the wall of the housing 10 where the cap opening 12 is located. The receptacle socket assembly 50 may in this way be exposed to the outside of the luminaire head, such that an operator may plug a module in the receptacle socket assembly 50 and at the same time may easily access the removable cap 30. The first wiring 20 may comprise at least one wire connected to the inner side 51 of the receptacle socket assembly 50. For instance the two or three AC main wires (L, N and/or G) coming in the luminaire head may be interconnected with the two or three AC inputs of the driver (L, N and/or G) and with the two or three AC inputs of an external module (L, N and/or G) plugged in the receptacle socket assembly 50. For example, the three line wires (L) of the mains, the driver and optionally the socket assembly may be fit in a connector 40 configured to receive and interconnect two or optionally three wires while the three neutral potential wires (N) of the mains, the driver and optionally the socket assembly may be fit in another connector 40 configured to receive and interconnect two or optionally three wires. Data wires (D+, D−) coming from an external controller module via the receptacle socket assembly 50 may be connected to data inputs/outputs of the driver via further additional connectors 40, each configured to receive and interconnect two wires. An operator may establish connections between an external wiring like the mains, a receptacle socket assembly 50 for a module and an internal wiring 25 from the driver via the connectors 40 provided to the inner side 31 of the removable cap 30.

The receptacle socket assembly may be one of a NEMA or a Zhaga socket assembly. The receptacle socket assembly may comprise a plurality of receptacle contacts. For example, a first plurality of receptacle contacts may extend substantially along a first cylindrical surface around the central axis of the assembly, and a second plurality of receptacle contacts may extends substantially along a second cylindrical surface around the central axis of the assembly. For example, a first plurality of receptacle contacts may fulfil the requirements of the NEMA standard. Alternatively, the front contact portions of a first plurality of receptacle contacts may extend flush with the front side of the receptacle. For example, the front contact portions of a plurality of receptacle contacts may fulfil the requirements of the ANSI C136.41-2013 standard or the ANSI C136.10-2017 standard. Alternatively, the front contact portions of a plurality of first receptacle contacts may be accessible via apertures in the front side of the receptacle and extend near the front side of the receptacle. For example, the front contact portions of a plurality of receptacle contacts may fulfil the requirements of the Zhaga standard (Book 18, Edition 1.0, July 2018, see https://www.zhagastandard.org/data/downlaodables/1/0/8/1/book_18.pdf.

Figure 8:
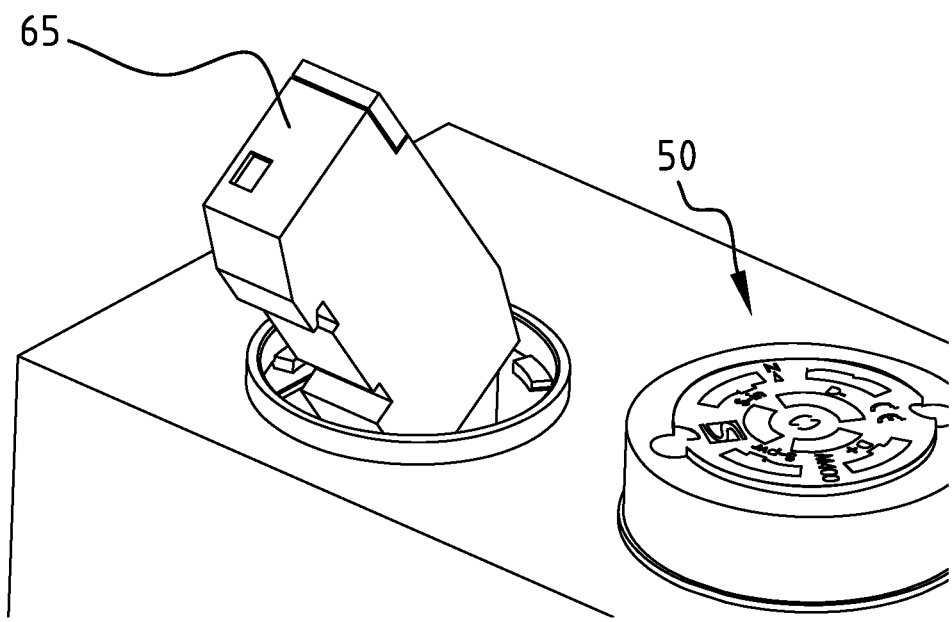
FIG. 8 show a view illustrating installation/replacement of a fuse according to an exemplary embodiment.
Figure 9:
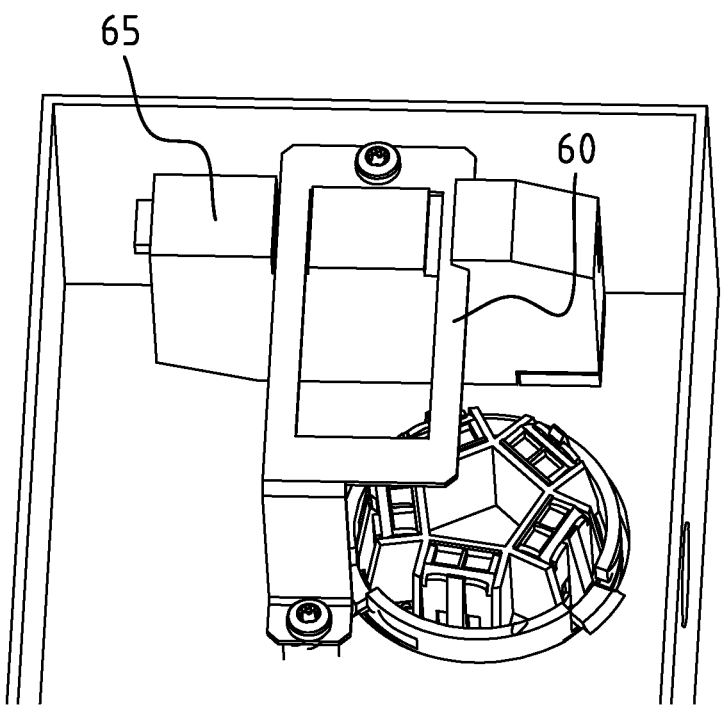
FIG. 9 shows a view of the inside of the housing illustrating an exemplary embodiment of a fuse holder.

FIG. 8 shows a view illustrating the replacement of a fuse holder 65, where the fuse holder 65 has been moved along the rail of the holder 60 towards the opening 12 and tilted off the rail to be extracted out of the opening. FIG. 9 shows a view of an exemplary embodiment of the fuse holder guiding assembly 60. The fuse holder guiding assembly 60 comprises a rail extending at a distance and parallel to the wall of the housing 10 away from the cap opening 12. The fuse holder 65 is stored in a storage position on the rail at a distance from the opening 12. During maintenance an operator may get hold of the fuse holder 65 via the cap opening 12 and may slide the fuse holder 65 along the rail of the fuse holder guiding assembly 60 towards the cap opening 12. The operator may then remove the old fuse holder 65 via the cap opening 12 and bring a new fuse holder in the housing via the cap opening 12. The operator may fix the new fuse holder in the fuse holder guiding assembly 60 and slide the fuse holder 65 back to the storage position. In this way the process of replacing a fuse holder 65 is simplified, and the movement of the fuse holder 65 is controlled, avoiding any damage to the connections and wirings inside the housing 10.

Alternatively once the fuse holder 65 is under the cap opening 12, the operator may choose to replace only the fuse contained in the fuse holder 65, by opening a latch (represented in FIG. 1) giving access to a fuse inside the fuse holder 65, replacing the fuse and closing the latch. Finally the fuse holder 65 may be put back into the storage position.

Figure 10:
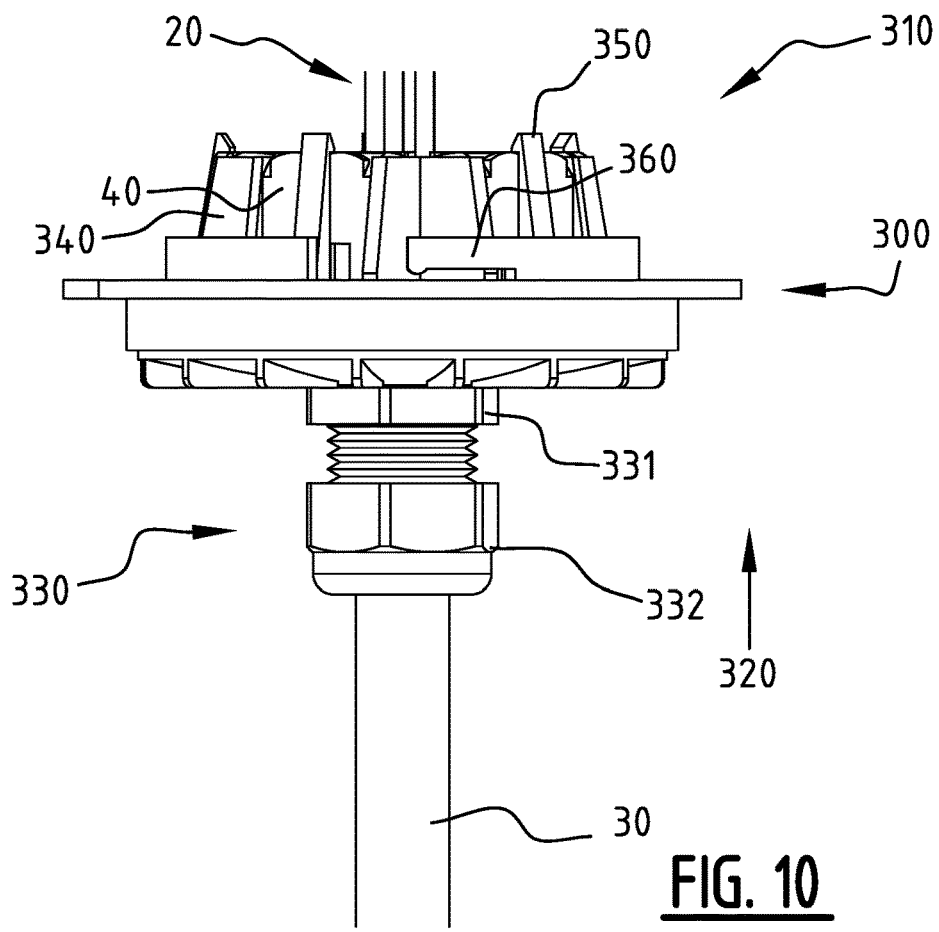
FIG. 10 shows a side view of an exemplary second embodiment of a cap.

FIG. 10 shows a side view of an exemplary second embodiment of a cap. When compared to the cap 30 shown in the previous figures, the cap 300 of FIG. 10 comprises further a cable opening 311, arranged in the middle part of the cap 300. The cable opening 311 may create a passage between the inner side 310 and the outer side 320 such that a wiring 20 may extend through the cable opening 311 inside the housing 10. In such an embodiment, the cable opening 311 may for instance serve as the cable opening 11 in the housing 10 of the previous embodiments. It is noted that the cable opening 11 may be further combined with a cable opening 311 to bring e.g. two different wirings inside the housing. For the ease of the description, a correspondence in reference numbers may be found between reference signs of the first embodiment in the range 31-70 and reference signs of the second embodiment in the range 310-370. As an example compartments 340 of the exemplary second embodiment correspond to compartments 34 of the exemplary first embodiment.

The cable opening 311 may be arranged in the middle of the cap 300 and compartments 340 for accommodating the connectors 40 may be located on the inner side of the cap 300 and around the cable opening 311. A cable gland 330 may be used to control the movements of the first wiring 20 with respect to the cap 300. The cable gland 330 may comprise a tubular element 331 threaded on a first longitudinal side to interact with a thread provided in the cable opening 311 and threaded on the opposite longitudinal side to interact with a nut element 332 to lock/unlock the first wiring 20. Further the screwing direction of element 331 may be the same as the screwing direction of element 332 (see also FIG. 11).

Upon installation, the cap 300 may be removed from the cap opening. The cable gland nut 332 may then be untightened. Next, through the cable gland 330, the first wiring 20 may be connected to the connectors 40. The following step is to pull back the first wiring 20 to a fixing position. Next the cable gland nut 332 is tightened. The first wiring 20 may then no longer be pulled out of the cap 300 and the first wiring 20 may be fixed such that it is not twisted when the cap 300 closes the cap opening 12. Next step is to put the cap 300 back into the cap opening and fix it in said cap opening by rotating it into place. Preferably the tubular element 331 may be screwed in place inside the cable opening 311 and the nut element 332 may be screwed in place with the tubular element 331 to lock any further movement of the first wiring 20

The cable gland 330 may seal the cable opening 311 receiving the first wiring 20 to prevent the ingress of water, dirt or dust inside the housing once the wiring 20 is locked with respect to the cable opening 311. The connection between the first wiring 20 and the connectors 40 may be effected in the same way as for the first exemplary embodiment and the arrangement of the compartments 340 for the connectors 40, using snap-fits mechanisms 350 is to be understood as identical to the one described for the compartments 40 of the exemplary first embodiment.

Figure 11:
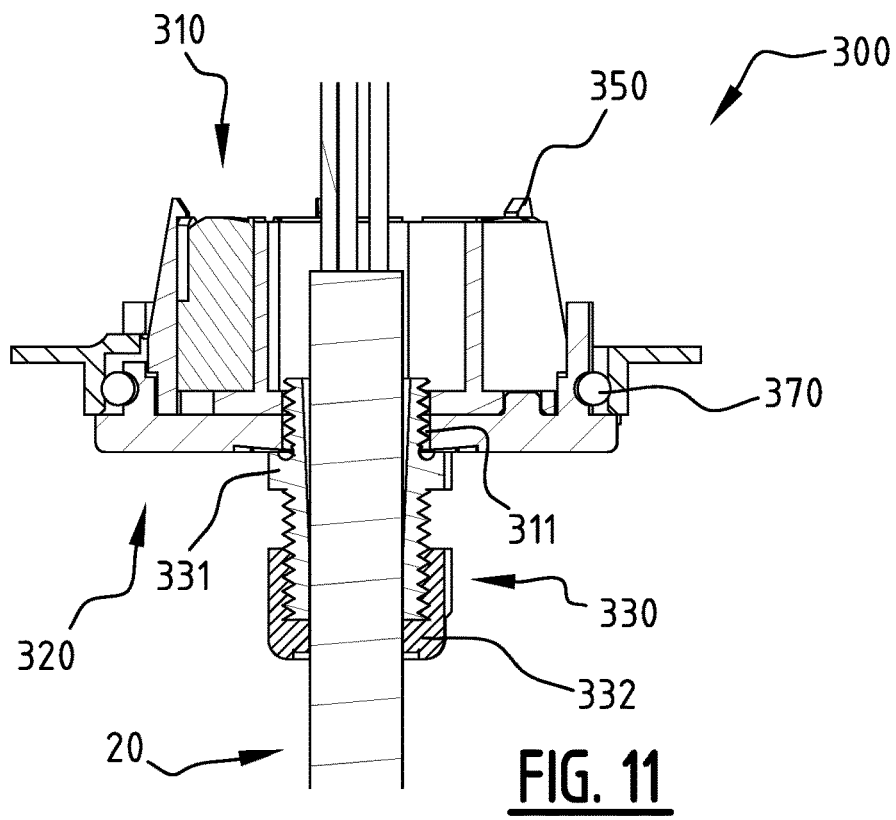
FIG. 11 shows a section of a cap according to the exemplary second embodiment fixed on a housing.

FIG. 11 shows a section of a cap according to the exemplary second embodiment fixed on a housing. Similarly to the first exemplary embodiment, a bayonet mechanism 360 may be provided on the periphery of the cap 300 to interact with the cap opening 12. In this way the cap 300 may be rotated and locked in the cap opening 12 in a toolless manner. A seal 370 may be provided between the cap 300 and the cap opening 12 to prevent the ingress of water, dirt or dust inside the housing once the cap 300 is locked in position and closes the cap opening 12. The seal 370 may be arranged at the periphery of the cap and compressed when inserting the cap 300 in the cap opening 12 as illustrated in FIG. 11.

Figure 12:
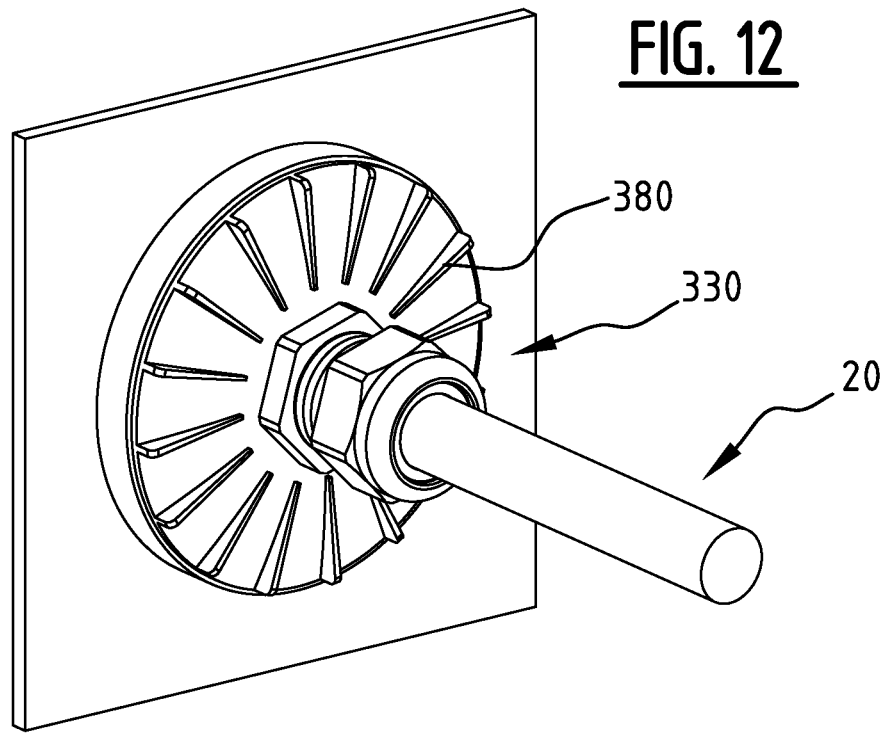
FIG. 12 shows a perspective view of a cap according to the exemplary second embodiment fixed on a housing and viewed from the outside of the housing.

FIG. 12 shows a perspective view of a cap according to the exemplary second embodiment fixed on a housing and viewed from the outside of the housing. Preferably protrusions as for instance fins 380 may be provided on the surface of the outer side 320 of the cap 300 such that a user may close the cap in a toolless manner.

Figure 13:
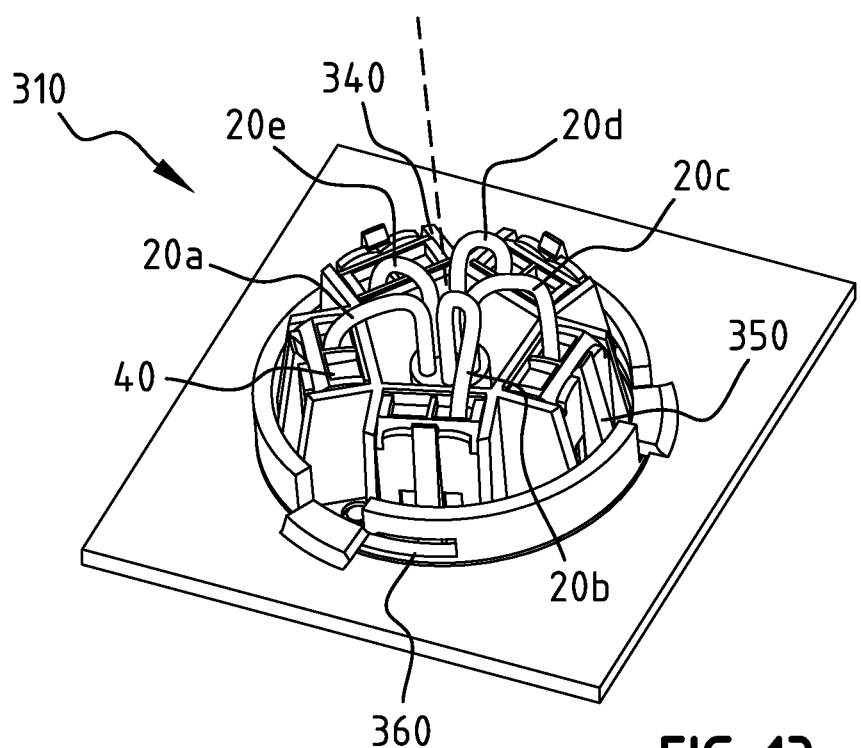
FIG. 13 shows a perspective view of a cap according to the exemplary second embodiment fixed on a housing and viewed from the inside of the housing.

FIG. 13 shows a perspective view of a cap according to the exemplary second embodiment fixed on a housing and viewed from the inside of the housing. In this embodiment the first wiring 20 is represented as comprising five wires 20a-20e which may each be connected to a connector 40 for further connection with a second internal wiring 25 (not represented). The way of connecting the first wiring 20 may be as for the first embodiment but may however be envisaged in many more ways.

As seen in FIG. 13, the cable opening 311 in the cap 300 may be central, providing an equi-distant connection between the wires 20a-20e of the wiring 20 and their respective connector 40. The compartments 340, the snap-fit mechanisms 350 and the connectors 40 may be distributed in a regular manner around the rotation axis A of the cap 300, providing a rotational symmetric arrangement of the inner side of the cap 300.

Besides although represented as fixed on a housing, the cap 300 is like in the first embodiment removable to allow a user to access the connectors 40 provided on the inner side 310 of the removable cap 300 for connecting the first wiring 20 to a second internal wiring 25 of the luminaire head. It is to be understood that all the functionalities described for the first embodiment also apply in the second embodiment.

According to another embodiment, not illustrated in the figures, a cap 300 can also be envisaged without the connectors 40. Preferably a cap 300 with a cable opening 311 may be envisaged to close a cap opening 12 in the vicinity of a fuse holder 60 arranged in the housing 10, for holding one or more fuses 65. The fuse holder 60 may then be accessible through the cap opening 12 while the cap 300 also serves as an entry point for a first wiring 20 inside the housing 10. Preferably similar arrangements as shown in FIGS. 7a, 7b, 8 and 9 may be envisaged with a cap 300 provided with a cable opening 310 for a first wiring 20 but without connectors 40.

Figure 14A:
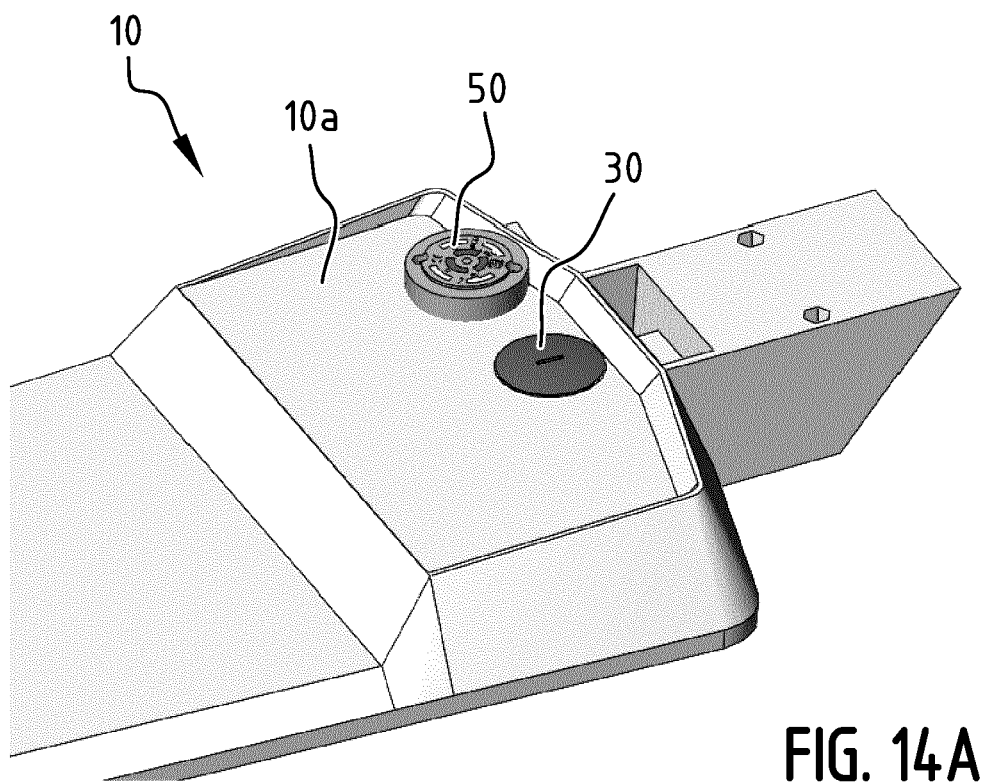
FIGS. 14A and 14B illustrate perspective views of an exemplary embodiment of a luminaire head mounted on a pole (not represented) comprising a removable cap.
Figure 14B:
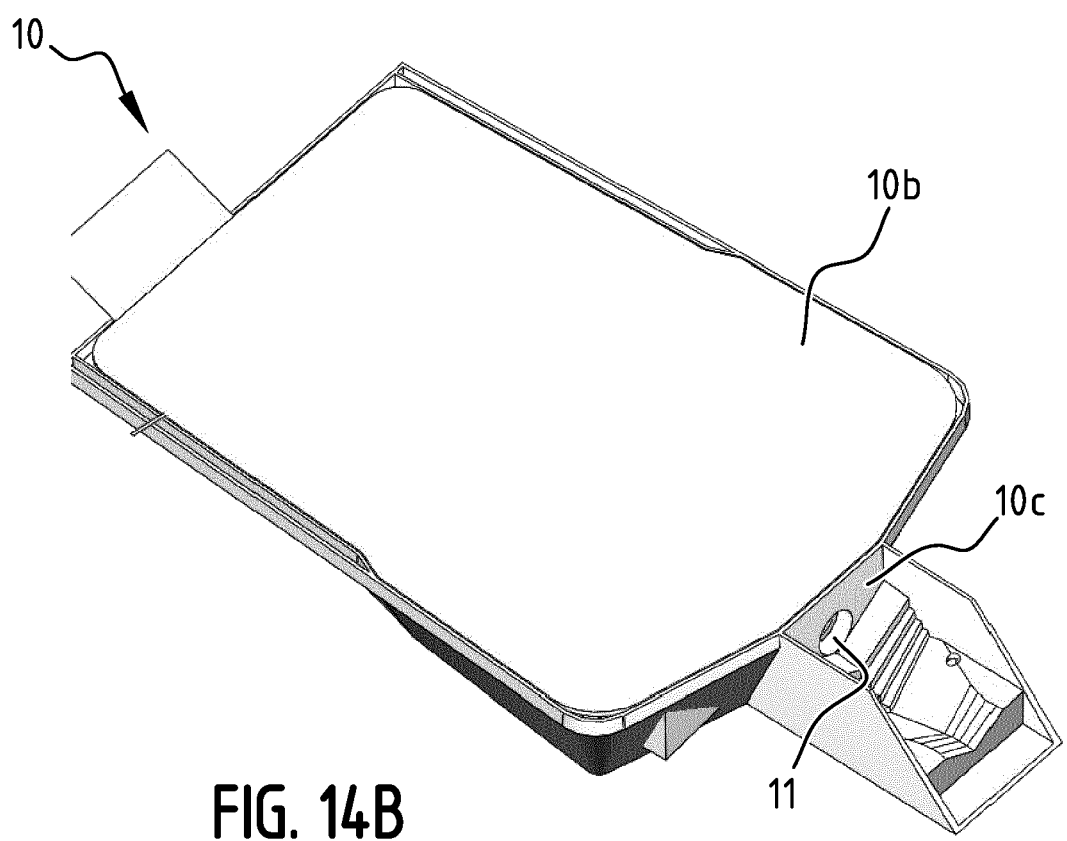

FIGS. 14A and 14B illustrate perspective views of an exemplary embodiment of a luminaire head mounted on a pole (not represented) comprising a removable cap. A luminaire head mounted on a pole comprises typically a light source and a driver housed in a housing 10 comprising a top surface 10a and a bottom surface 10b, wherein the bottom surface has a transparent portion such that the light of the light source may go through the transparent portion. The housing 10 may further comprise a side surface 10c having a cable opening 11 for receiving power from the mains via a pole. The side surface 10c may also be used for connecting the housing 10 to the pole. A removable cap 30 (or 300 not represented) may then be provided on the top surface 10a together with an optional receptacle socket assembly 50 for an optional controller module. The cap opening may then be provided in the surface 10a, optionally in the vicinity of the socket opening 13, and preferably in the vicinity of an edge between the surface 10a and the surface 10c such that the cable opening 11, the cap opening and the socket opening are substantially in the same part of the housing. Alternatively the cap opening and the socket opening may be excentered from the connection of the housing 10 to the pole.

Such luminaire heads are typically used for outdoor luminaires.

Figure 15A:
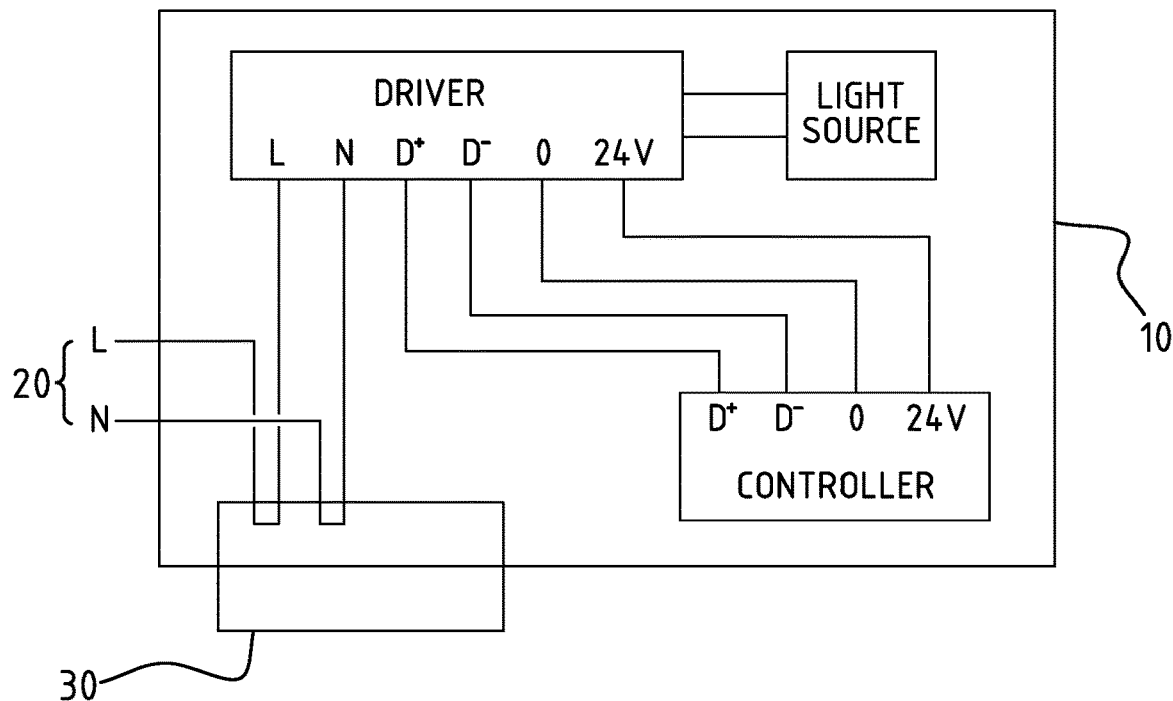
Figure 15B:
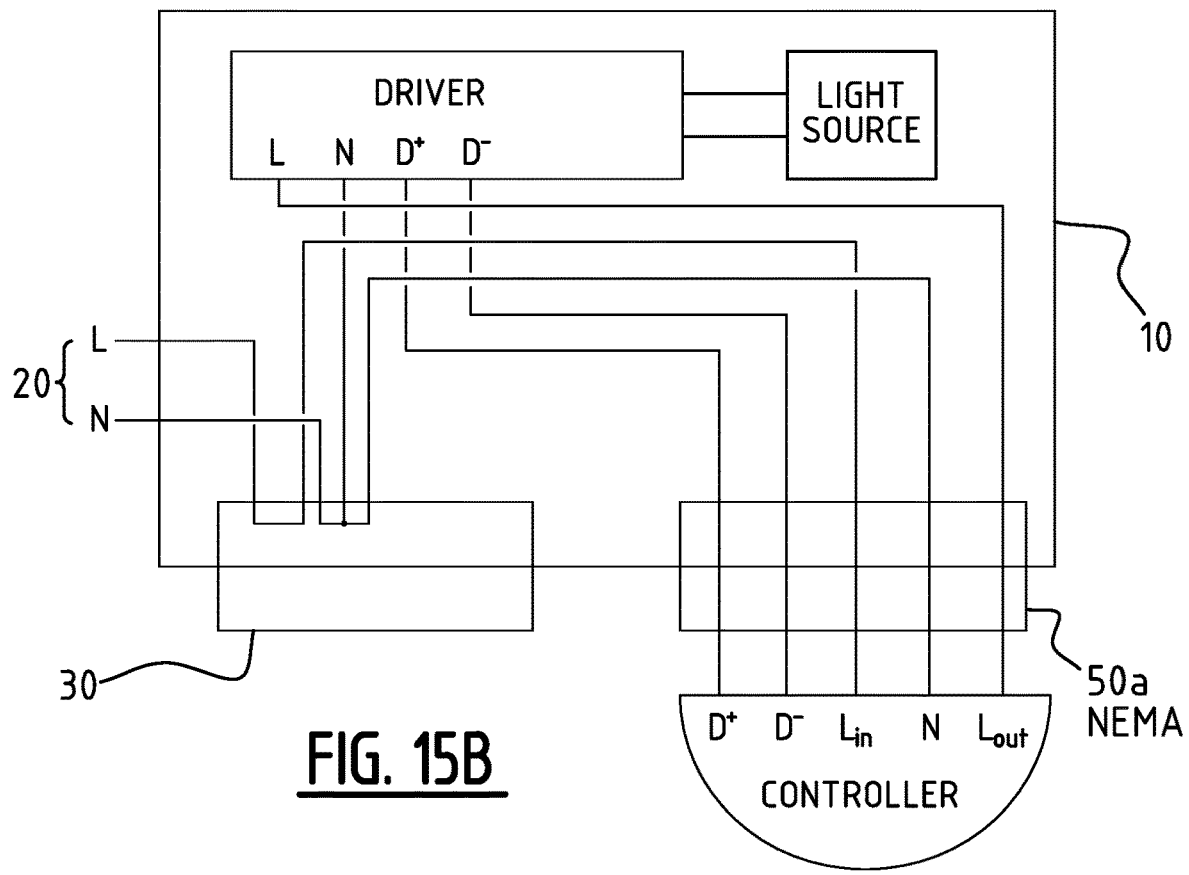

FIGS. 15A, 15B and 15C illustrate schematic views of internal connections inside a cap 30 according to the first exemplary embodiment for three different configurations. In FIG. 15A no receptacle socket assembly 50 is present on the housing 10, while in FIG. 15B a NEMA receptacle socket assembly 50a is present on the housing 10, and in FIG. 15C a Zhaga receptacle socket assembly 50b is present on the housing 10. A driver is in all three configurations present in the housing 10 for driving a light source.

As illustrated in FIG. 15A, an internal controller may provide dimming signal D+ and D− to the driver. The driver may be powering the internal controller, with for instance low DC power, e.g. 24V. Alternatively the internal controller may be powered from the mains wiring. The mains wiring 20 may comprise typically a line wire L and a neutral wire N, optionally a ground wire may also be present (not represented). On the inner side of the cap 30, two connectors may be provided. Two connectors for either the line wire L or the neutral wire N may each receive two wires for interconnecting the mains wiring to the driver.

As illustrated in FIG. 15B, an external controller plugging into the NEMA receptacle socket assembly 50a may provide dimming signal D+ and D− to the driver. Power for the external controller may be derived directly from the mains wiring 20 while power for the driver may be derived from the controller via a line wire Lout. The mains wiring 20 may comprise typically a line wire L and a neutral wire N, optionally a ground wire may also be present (not represented). On the inner side of the cap 30, two connectors may be provided. Two connectors may each receive two or three wires for interconnecting the mains wiring, the driver and the receptacle socket assembly. These connectors may be dedicated for either the line wire L or the neutral wire N. One connector may receive two wires for interconnecting the line wire L with a line wire Lin of the controller, while the other connector may receive three wires for interconnecting the neutral line wire N of the mains wiring 20 with the controller and the driver.

As illustrated in FIG. 15C, an external controller plugging into the Zhaga receptacle socket assembly 50b may provide dimming signal D+ and D− to the driver. Power for the external controller may be derived directly from the mains or optionally from the driver, for instance low DC power e.g. 24V. The mains wiring 20 may comprise typically a line wire L and a neutral wire N, optionally a ground wire may also be present (not represented). On the inner side of the cap 30, two connectors may be provided. Two connectors for either the line wire L or the neutral wire N may each receive two wires for interconnecting the mains wiring to the driver.

Figure 16A:
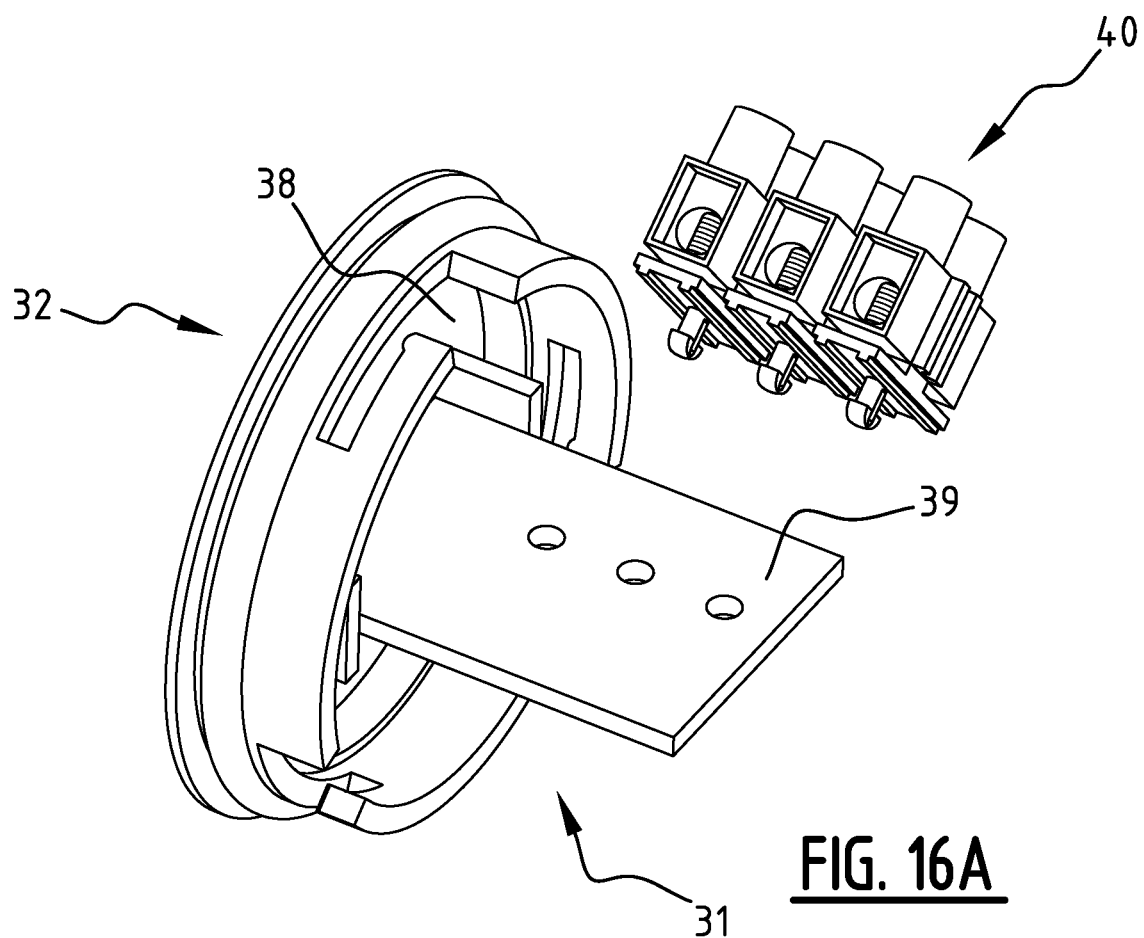
FIGS. 16A and 16B illustrate views of the inner side of a cap according to an exemplary third embodiment.
Figure 16B:
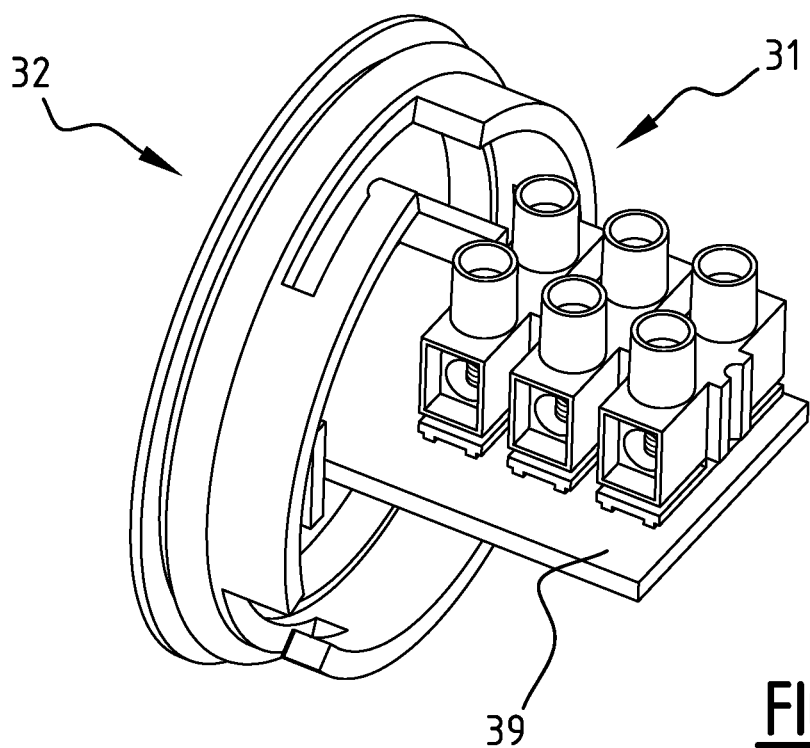

FIGS. 16A and 16B illustrate views in which a third exemplary embodiment of a removable cap 30 is free from the housing 10 and the inner side 31 of the cap 30 is exposed. The embodiment of FIGS. 16A and 16B differs from the embodiment of FIG. 4 in that the one or more connectors 40 may be provided on a support plate 39 protruding from the inner side 31 of the removable cap 30. In an embodiment the one or more connectors 40 may be located on at least one side of the support plate 39. It is noted that, although only connectors on one side of the support plate 39 have been represented in FIG. 7, in an alternative embodiment, connectors may be provided on both sides of the support plate 39.

The one or more connectors 40 may be standard cheap connectors. The connectors 40 may be screw-down connectors for fixing the wires of the first and second wiring inside the one or more connectors 40 using screws. The connectors 40 may be arranged next to each other, for instance in a strip of screw down terminals, and may be snap fit into the support plate 39, for instance via holes through the support plates 39. The connectors 40 may be oriented such that the wires of the first wiring and the wires of the second wiring are guided to be parallel with each other. For example, the wires of the first and second wiring may be arranged two by two, facing each other, in a respective connector. More in particular, a wire of the first wiring may be connected to one side of a connector while the corresponding wire of the second wiring may be connected on the opposite side of that connector. In this way, an easy installation of all the wires may be achieved. Other fixing ways may be contemplated by a person skilled in the art.

The support plate 39 may be configured as a plate extending perpendicularly from a surface 38 of the inner side 31 of the removable cap 30. The support plate 39 may extend substantially parallel to an axial direction A of the cap 30. The support plate 39 may be configured as a plate intersecting the inner side 31 of the removable cap 30 along a diameter of said cap 30. The support plate 39 may have a width smaller than the diameter of the cap. The support plate 39 may have a length configured for housing the at least one or more connectors 40.

The support plate 39 may be integral to the cap 30 and may be for instance moulded as one piece with the cap 30. The rest of the cap 30 may be identical to the cap of the embodiment of FIG. 4, especially as far as the general geometry and interaction with the housing are concerned.

Figure 17:
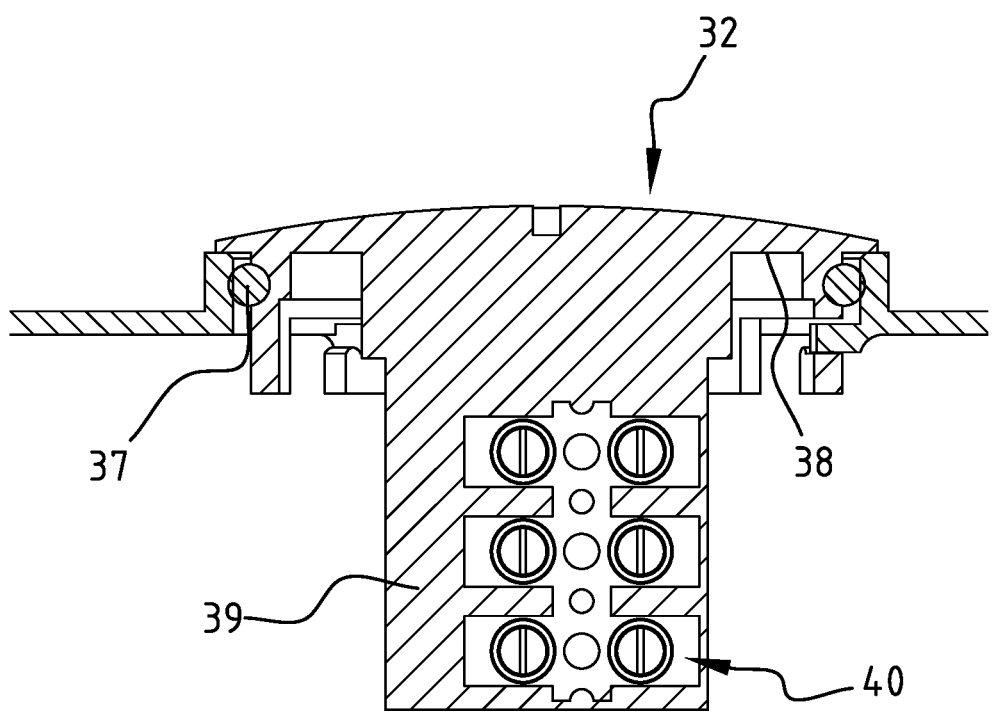
FIG. 17 illustrates a section of a cap according to the exemplary third embodiment fixed on a housing.

FIG. 17 shows for instance, where similar reference numbers are used for similar elements, a section of the cap of FIGS. 16A and 16B when mounted in an opening 12 where a bayonet mechanism is provided on the periphery of the cap to interact with the cap opening. In this way the cap 30 may be rotated and locked in the cap opening 12 in a toolless manner. A seal 37 may be provided between the cap 30 and the cap opening 12 to prevent the ingress of water, dirt or dust inside the housing once the cap 30 is locked in position and closes the cap opening 12. The seal 37 may be arranged at the periphery of the cap and compressed when inserting the cap 30 in the cap opening 12.

Whilst the principles of the invention have been set out above in connection with specific embodiments, it is understood that this description is merely made by way of example and not as a limitation of the scope of protection which is determined by the appended claims.

The invention claimed is:

1. A luminaire head comprising:
a housing having a cap opening,
a removable cap for closing the cap opening of the housing, said removable cap having an inner side and an outer side,
one or more connectors provided to the inner side of the removable cap for connecting at least a first wiring to a second internal wiring of the luminaire head.

2. The luminaire head according to claim 1, wherein the housing has a cable opening and the first wiring comprises at least one wire extending through the cable opening inside the housing, and/or wherein the removable cap has a cable opening creating a passage between the inner side and the outer side and the first wiring comprises at least one wire extending through the cable opening inside the housing.

3. The luminaire head according to claim 1, wherein the cap is rotatable around an axis in the cap opening between a first position in which the cap is free and a second position in which the cap is fixed in the cap opening.

4. The luminaire head according to claim 1, wherein the one or more connectors are oriented to guide the first wiring and the second wiring substantially parallel to an axial direction of the cap.

5. The luminaire head according to claim 1, wherein the one or more connectors are fixed in the cap through a snap-fit mechanism.

6. The luminaire head according to claim 1, wherein each connector is configured for receiving at least two wires.

7. The luminaire head according to claim 1, wherein a largest dimension of the removable cap is smaller than 15 centimeters.

8. The luminaire head according to claim 1, wherein the cap opening is substantially round.

9. The luminaire head according to claim 1, wherein the removable cap is configured to be fixed toolless to the housing, and/or further comprising a seal between the cap and the housing.

10. The luminaire head according to claim 1, wherein the housing has a socket opening, the luminaire head further comprising a receptacle socket assembly mounted in the socket opening, wherein preferably the first wiring and/or the second internal wiring comprises at least one wire connected to the inner side of the receptacle socket assembly, and/or wherein the receptacle socket assembly is one of a NEMA or a Zhaga socket assembly.

11. The luminaire head according to claim 1, further comprising a fuse holder guiding assembly arranged in the housing, for guiding one or more fuse holders, said fuse holder holding one fuse and said fuse holder guiding assembly being accessible through the cap opening.

12. The luminaire head according to claim 11, wherein the fuse holder guiding assembly is provided with a rail such that the fuse holder is slidable under the cap opening.

13. The luminaire head according to claim 1, further comprising:
a light source, and
a driver for driving the light source, the driver receiving power and/or data from the second internal wiring of the luminaire head.

14. A cap for use in a luminaire head, said cap having an inner side and an outer side, said inner side being provided with one or more connectors for connecting a first wiring to a second internal wiring of the luminaire head.

15. The cap according to claim 14, further comprising a cable opening for arranging at least one wire of the first wiring through the cap, said cable opening creating a passage from the inner side to the outer side of the cap.

16. The cap according to claim 15, further comprising a cable gland configured for allowing a rotation of the cap with respect to the at least one wire in an unlocked state and for locking the at least one wire in the cap in a locked state, and/or further comprising a screw thread or a bayonet on a periphery of the cap, and/or further comprising a seal along a periphery of the cap.

17. The cap according to claim 14, wherein the outer side of the cap is shaped for a toolless installation and/or further comprising one or more compartments provided on the inner side of the cap for accommodating the one or more connectors.

18. The luminaire head according to claim 1, wherein the one or more connectors are oriented to guide the first wiring and the second wiring substantially parallel to each other.

19. The luminaire head according to claim 1, wherein the one or more connectors are arranged on a support plate extending substantially parallel to an axial direction of the cap.

20. The luminaire head according to claim 1, wherein the one or more connectors are oriented such that the wires of the first wiring and the wires of the second wiring are guided substantially parallel to each other.

* * * * *